(12) United States Patent
Burnett et al.

(10) Patent No.: US 11,835,496 B2
(45) Date of Patent: Dec. 5, 2023

(54) SAMPLE METERING AND INJECTION FOR LIQUID CHROMATOGRAPHY

(71) Applicant: Waters Technologies Corporation, Milford, MA (US)

(72) Inventors: Joshua A. Burnett, Taunton, MA (US); Rose Solow, Newark, NJ (US); David A. Simpson, Hopkinton, MA (US)

(73) Assignee: Waters Technologies Corporation, Milford, MA (US)

( * ) Notice: Subject to any disclaimer, the term of this patent is extended or adjusted under 35 U.S.C. 154(b) by 193 days.

(21) Appl. No.: 17/126,236

(22) Filed: Dec. 18, 2020

(65) Prior Publication Data
US 2021/0190734 A1   Jun. 24, 2021

Related U.S. Application Data

(60) Provisional application No. 62/952,871, filed on Dec. 23, 2019.

(51) Int. Cl.
*G01N 30/24* (2006.01)
*G01N 30/20* (2006.01)
(Continued)

(52) U.S. Cl.
CPC ............. *G01N 30/24* (2013.01); *G01N 30/20* (2013.01); *G01N 30/36* (2013.01);
(Continued)

(58) Field of Classification Search
CPC ....... G01N 2030/027; G01N 2030/201; G01N 2030/202; G01N 30/20; G01N 30/24; G01N 30/36
See application file for complete search history.

(56) References Cited

U.S. PATENT DOCUMENTS 4,939,943 A   7/1990 Strohmeier
4,957,009 A   9/1990 Nohl et al.
(Continued)

FOREIGN PATENT DOCUMENTS

EP   3008463 B1   4/2021
GB   2486678 A    6/2012
(Continued)

OTHER PUBLICATIONS

Malcom Bennett, Shear-Seal Valves from Barksdale Controls, Techniquip, Sep. 8, 2017 (Year: 2017).*
(Continued)

*Primary Examiner* — David L Singer
(74) *Attorney, Agent, or Firm* — Schmeiser, Olsen & Watts LLP; William G. Guerin, Esq.

(57) ABSTRACT

A method and a fluidic network for acquiring and injecting a chromatographic sample into a chromatography system flow include a metering pump module, a sample needle, a needle seal and an injection valve. The metering pump module includes a metering pump and a pressure transducer in serial fluidic communication. When the injection valve is in a first valve state, the injection valve is configured to fluidically terminate ports of the metering pump module. When the injection valve is in a second valve state, the injection valve is configured to fluidically couple a fluidic path that includes the metering pump module and sample needle into the system flow of a chromatography system without resulting in a substantial change in the pressure of the system flow.

10 Claims, 22 Drawing Sheets

(51) Int. Cl.
*G01N 30/36* (2006.01)
*G01N 30/02* (2006.01)

(52) U.S. Cl.
CPC . *G01N 2030/027* (2013.01); *G01N 2030/201* (2013.01); *G01N 2030/202* (2013.01)

(56) References Cited

U.S. PATENT DOCUMENTS

| | | | |
|---|---|---|---|
| 5,100,557 A | 3/1992 | Nogami et al. | |
| 5,814,742 A | 9/1998 | Vissers et al. | |
| 6,129,840 A | 10/2000 | Kitaoka | |
| 6,296,771 B1 | 10/2001 | Miroslav | |
| 6,382,035 B1 | 5/2002 | Nichols | |
| 6,498,040 B1 | 12/2002 | Yokoyama et al. | |
| 6,576,125 B2 | 6/2003 | Berger et al. | |
| 6,662,818 B2 | 12/2003 | Paul et al. | |
| 6,776,902 B2 | 8/2004 | Petro | |
| 6,955,760 B2 | 10/2005 | Iwata | |
| 6,962,658 B2 | 11/2005 | Neyer et al. | |
| 7,163,379 B2 | 1/2007 | Mori et al. | |
| 7,195,229 B2 | 3/2007 | Maeda | |
| 7,288,228 B2 | 10/2007 | LeFebvre | |
| 7,507,337 B2 | 3/2009 | Petro et al. | |
| 7,555,937 B2 | 7/2009 | Hirayama et al. | |
| 7,797,989 B2 | 9/2010 | Swart et al. | |
| 7,951,597 B2 * | 5/2011 | Usowicz | G01N 1/14 422/67 |
| 8,191,404 B2 | 6/2012 | Ono et al. | |
| 8,297,936 B2 | 10/2012 | Witt et al. | |
| 8,322,197 B2 | 12/2012 | Koster et al. | |
| 8,410,426 B2 | 4/2013 | Ozbal et al. | |
| 8,574,918 B2 | 11/2013 | Hirayama et al. | |
| 8,806,922 B2 | 8/2014 | Hochgraeber | |
| 9,435,773 B2 | 9/2016 | Glatz et al. | |
| 9,624,923 B2 | 4/2017 | Ruegenberg et al. | |
| 9,664,653 B2 | 5/2017 | Hochgraeber | |
| 9,841,406 B2 | 12/2017 | Yotani et al. | |
| 10,371,671 B2 | 8/2019 | Ortmann et al. | |
| 10,473,631 B2 | 11/2019 | Wachinger | |
| 10,473,632 B2 | 11/2019 | Thielsch et al. | |
| 10,641,746 B2 | 5/2020 | Thielsch et al. | |
| 10,722,816 B2 | 7/2020 | Hochgraeber et al. | |
| 10,955,092 B2 | 3/2021 | Andrei et al. | |
| 11,098,702 B2 | 8/2021 | Yanagibayashi | |
| 11,156,589 B2 | 10/2021 | Hochgraeber | |
| 11,275,062 B2 | 3/2022 | Thielsch et al. | |
| 2006/0045810 A1 | 3/2006 | Choikhet et al. | |
| 2008/0206067 A1 | 8/2008 | De Corral et al. | |
| 2012/0024048 A1 | 2/2012 | Maeda | |
| 2012/0103075 A1 | 5/2012 | Cormier et al. | |
| 2012/0145617 A1 | 6/2012 | Lee et al. | |
| 2012/0240454 A1 | 9/2012 | Boyd et al. | |
| 2012/0240666 A1 | 9/2012 | Sims | |
| 2014/0004022 A1 | 1/2014 | Sagona et al. | |
| 2014/0157871 A1 * | 6/2014 | Dubant | G01N 30/06 73/23.41 |
| 2015/0047422 A1 * | 2/2015 | Berg | G01N 30/16 73/61.56 |
| 2015/0089997 A1 * | 4/2015 | Nema | G01N 30/06 73/23.4 |
| 2015/0276690 A1 * | 10/2015 | Hudalla | B01J 20/205 73/23.39 |
| 2016/0327514 A1 | 11/2016 | Shoykhet et al. | |
| 2017/0197942 A1 * | 7/2017 | Hong | B01J 20/265 |
| 2017/0283391 A1 * | 10/2017 | Runco | B01J 20/24 |
| 2018/0364203 A1 * | 12/2018 | Burnett | G01N 30/06 |
| 2020/0182235 A1 | 6/2020 | Yanagibayashi et al. | |
| 2020/0340956 A1 | 10/2020 | Ortmann et al. | |

FOREIGN PATENT DOCUMENTS

| | | |
|---|---|---|
| GB | 2588635 A | 5/2021 |
| GB | 2591435 A | 8/2021 |
| GB | 2601374 A | 6/2022 |

OTHER PUBLICATIONS

Invitation to Pay Additional Fees in PCT/US2020/065802 mailed on Mar. 17, 2021.
International Search Report and Written Opinion in PCT/US2020/065802 dated May 11, 2021.
International Preliminary Report on Patentability in PCT/US2020/065802 dated Jul. 7, 2022.

* cited by examiner

SAMPLE METERING AND INJECTION FOR LIQUID CHROMATOGRAPHY

RELATED APPLICATION

This application claims the benefit of the earlier filing date of U.S. Provisional Patent Application Ser. No. 62/952,871, filed Dec. 23, 2019 and titled "Sample Metering and Injection for Liquid Chromatography," the entirety of which is incorporated herein by reference.

FIELD OF THE INVENTION

The invention relates generally to liquid chromatography systems. More particularly, the invention relates to fluidic networks for loading of a chromatographic sample and injection of the sample into a liquid chromatography system.

BACKGROUND

High performance liquid chromatography (HPLC) and ultra-performance liquid chromatography (UPLC®) systems typically include a pump for delivering a fluid (the "mobile phase") at a controlled flow rate and composition, an injector to introduce a sample solution into the liquid chromatography system flow (the "mobile phase"), a chromatographic column that contains a packing material or sorbent (the "stationary phase"), and a detector to detect the presence and amount of sample components in the mobile phase leaving the column. When the mobile phase passes through the stationary phase, each component of the sample typically emerges from the column at a different time because different components in the sample typically have different affinities for the packing material. The presence of a particular component in the mobile phase exiting the column is detected by measuring changes in a physical or chemical property of the eluent. By plotting the detector signal as a function of time, chromatographic "peaks" corresponding to the presence and quantities of the components of the sample can be observed.

In some fluidic networks employing a sample needle, a syringe is used to prime the fluidic path that includes the sample needle. The syringe is also used to acquire sample from a sample vial or other sample source. Often, bubbles are present in the fluidic path. Priming is generally performed at atmospheric pressure and the flow of the solvent through the fluidic path during priming may not sufficiently displace the bubbles.

In various applications, it is desirable to acquire small volumes of sample for analysis. For example, samples as small as 0.1 uL with a standard deviation of sample volume not to exceed 1%. The ability to acquire such small samples may be limited by the presence of bubbles. Consequently, the volumes of acquired sample can vary significantly despite the same intake volume stroke of the syringe.

SUMMARY

In one aspect, a fluidic network for acquiring and injecting a chromatographic sample includes a metering pump module, a sample needle, a needle seal and an injection valve. The metering pump module includes a metering pump and a pressure transducer in serial fluidic communication. The metering pump module has a first pump port and a second pump port. The sample needle has a needle tip. The needle seal is configured to receive the needle tip of the sample needle. The injection valve has a plurality of valve ports. A first one of the valve ports is in fluidic communication with the first pump port and a second one of the valve ports is in fluidic communication with the needle seal. The injection valve is operable in at least two valve states. When the injection valve is in the first valve state, the injection valve is configured to fluidically terminate the first and second pump ports. When the injection valve is in the second valve state, the injection valve is configured to fluidically couple a third valve port to the first valve port and to fluidically couple a fourth valve port to the second valve port.

The third valve port may be fluidically coupled to a source of a solvent flow and the fourth valve port may be fluidically coupled to a chromatographic column.

When the needle tip of the sample needle is received in the needle seal, a continuous fluidic path may be defined from the first valve port through the metering pump module, sample needle and needle seal to the second valve port. When the needle tip of the sample needle is received in the needle seal and the injection valve is in the first valve state, the metering pump may be operable to generate a pressure in the continuous fluidic path that exceeds 1,000 psi and, in some examples, may exceed 10,000 psi.

In another aspect, a method for injecting a chromatographic sample into a chromatography system flow includes aspirating a chromatographic sample into a sample needle and forming a fluidic path that passes through the sample needle. The fluidic path is terminated at each end and the chromatographic sample is included in the liquid in the fluidic path. A pressure of the liquid in the fluidic path is increased to a value that is substantially equal to a pressure of the liquid chromatography system and the fluidic path is inserted into the liquid chromatography system flow such that the chromatographic sample flows to a chromatography column in the liquid chromatography system.

A difference in the increased pressure of the liquid in the fluidic path and the pressure of the liquid chromatography system at a time of insertion may be less than that 10% of the pressure of the liquid chromatography system.

Forming the fluidic path may include coupling a needle tip of the sample needle into a needle seal that is in fluidic communication with one of the ends of the fluidic path.

Each end of the fluidic path may be terminated at a respective valve port of an injection valve when the injection valve is in a first valve state. Inserting the fluidic path into the liquid chromatography system flow may include switching the injection valve from the first valve state to a second valve state.

The method may further include monitoring the pressure of the liquid in the fluidic path while increasing the pressure to determine that the pressure of the liquid in the fluidic path is substantially equal to the pressure of the liquid chromatography system.

In still another aspect, a fluidic network for acquiring and injecting a chromatographic sample includes a metering pump module, a sample needle, a needle seal, a sample valve and a merge valve. The metering pump module includes a metering pump and a pressure transducer in serial fluidic communication with each other. The metering pump module has a first pump port and a second pump port. The sample needle has a needle tip. The needle seal is configured to receive the needle tip of the sample needle. The sample valve is operable in at least a first valve state and a second valve state, and is in fluidic communication with the metering pump module and the sample needle. The merge valve is operable in at least a first valve state and a second valve state, and is in fluidic communication with the sample valve and the needle seal. When the sample valve is in the second valve state and the merge valve is in the first valve state, the metering pump is operable to acquire a sample through the sample needle. When the sample valve is in the second valve state, the merge valve is in the first valve state and the needle tip is in the needle seal, the metering pump is operable to pressurize the fluidic network to a system pressure. When the sample valve is in the second valve state, the merge valve is in the second valve state and the needle tip is in the needle seal, a system flow passes through the fluidic network such that the sample acquired through the sample needle is merged into the system flow.

When the sample valve is in the second valve state, the merge valve is in the second valve state and the needle tip is in the needle seal, the system flow may be combined in the fluidic network with the sample acquired through the sample needle such that the sample is diluted by the system flow.

When the sample valve is in the second valve state, the merge valve is in the second valve state and the needle tip is in the needle seal, the system flow may pass through the fluidic network such that the sample acquired through the sample needle is injected into the system flow as a fluidic plug.

The fluidic network may include a purge solvent reservoir in fluidic communication with the sample valve. Alternatively, the fluidic network may include a fluidic channel fluidically coupled at one end to the sample valve and fluidically coupled at an opposite end to a waste channel.

At least one of the sample valve and the merge valve may be a six-port rotary shear seal valve.

BRIEF DESCRIPTION OF THE DRAWINGS

The above and further advantages of this invention may be better understood by referring to the following description in conjunction with the accompanying drawings, in which like reference numerals indicate like elements and features in the various figures. Letters may be appended to reference numbers to distinguish from reference numbers for similar features and to indicate a correspondence to other features in the drawings. For clarity, not every element may be labeled in every figure. The drawings are not necessarily to scale, emphasis instead being placed upon illustrating the principles of the invention.

DETAILED DESCRIPTION

Reference in the specification to "one example" or "an example" means that a particular feature, structure or characteristic described in connection with the example is included in at least one example of the teaching. References to a particular example within the specification do not necessarily all refer to the same example.

In brief overview, a fluidic network for acquiring and injecting a chromatographic sample includes a metering pump module, a sample needle, a needle seal and an injection valve. The metering pump module includes a metering pump and a pressure transducer in serial fluidic communication. One of the valve ports of the injection valve is in fluidic communication with the metering pump module and a second one of the valve ports is in fluidic communication with the needle seal. The injection valve is operable in at least two valve states. When the injection valve is in the first valve state, the injection valve is configured to fluidically terminate ports of the pump module. When the injection valve is in the second valve state, the injection valve is configured to fluidically couple a third valve port to the first valve port and to fluidically couple a fourth valve port to the second valve port. One advantage of the fluidic network is the lack of a substantial change in the system pressure at the time of injection. Moreover, only a single valve is required. The chromatography system pump can be primed at atmospheric pressure through the sample needle and to waste therefore there is no need for a vent valve at the system pump. In addition, the flow rate during priming can be substantially greater than the system flow rate used during separations. Another benefit of the fluidic network is that new solvent that has been degassed is constantly provided from the system pump at full pressure and used to push the acquired sample so that there is no means for bubble formation.

The present teaching will now be described in more detail with reference to examples shown in the accompanying drawings. While the present teaching is described in conjunction with various examples, it is not intended that the present teaching be limited to such examples. On the contrary, the present teaching encompasses various alternatives, modifications and equivalents, as will be appreciated by those of skill in the art. Those of ordinary skill having access to the teaching herein will recognize additional implementations, modifications and examples, as well as other fields of use, which are within the scope of the present disclosure.

Figure 1:
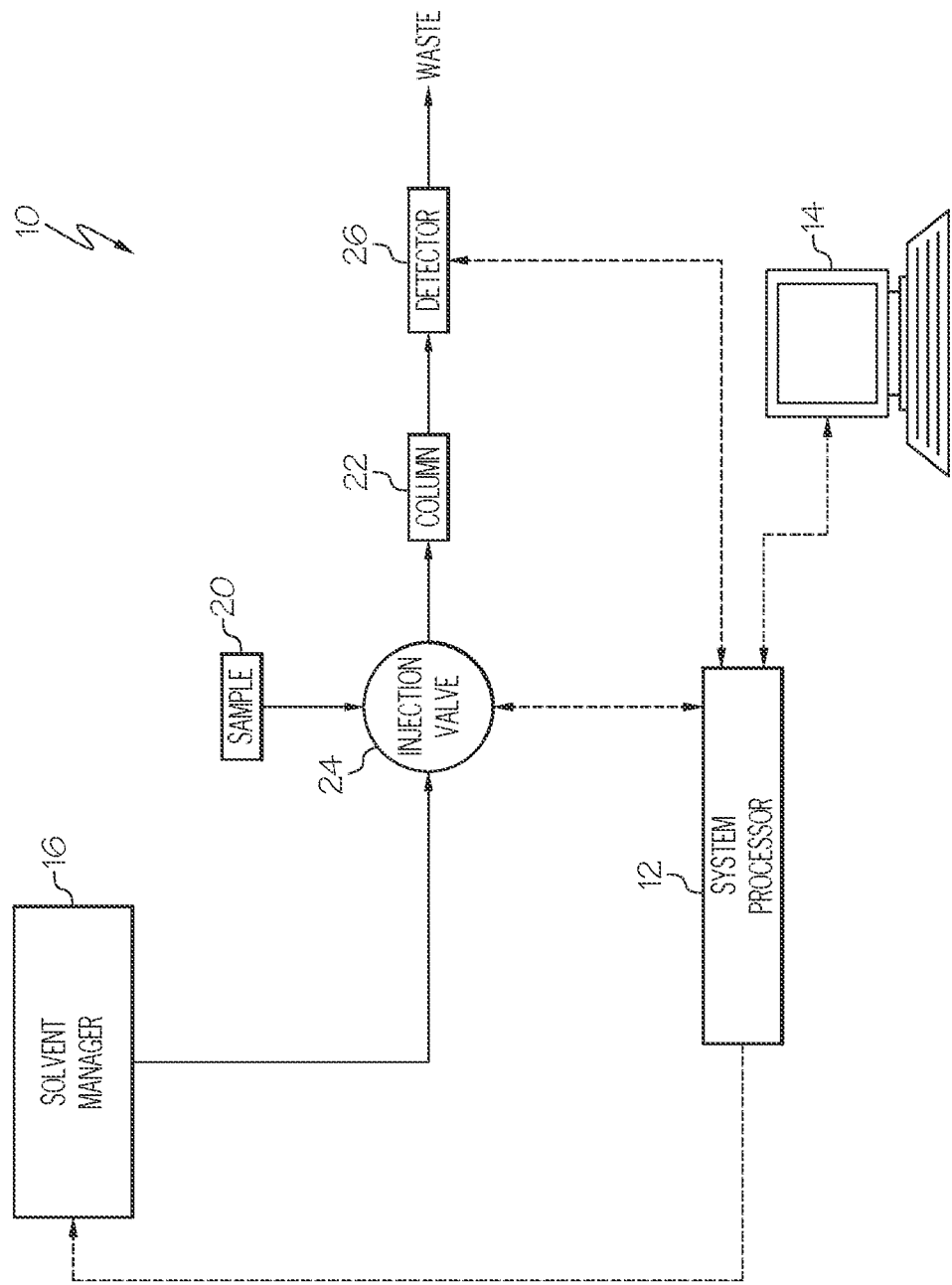
FIG. 1 is a block diagram of an example of a liquid chromatography system.

FIG. 1 is a block diagram of a conventional liquid chromatography system 10. The system 10 includes a system processor 12 (e.g., microprocessor and controller) in communication with a user interface device 14 for receiving input parameters and displaying system information to an operator. The system processor 12 communicates with a solvent manager 16 which provides a single solvent or a combination of solvents as a mobile phase. For example, the solvent manager 16 may be capable of supplying an isocratic mobile phase and a gradient mobile phase. A sample from a sample source 20 is injected into the mobile phase upstream from a chromatographic column 22 at an injection valve 24. The sample source 20 can be a sample reservoir such as a vial or other container that holds a volume of the sample solution. The chromatographic column 22 is coupled to a detector 26 which provides a signal to the system processor 12 that is responsive to various components detected in the eluent from the column 22. After passing through the detector 26, the system flow may exit through a waste port. Alternatively, the system 10 may include a diverter valve (not shown) to receive the system flow from the detector 26. The diverter valve can be used as part of a fraction collection process in which the diverter valve diverts each separated sample component in the system flow to a corresponding collection vessel.

In the fluidic networks described below, each network includes one or more configurable valves to configure fluidic paths for the network. Each valve may be in communication with a valve control module used to switch the valve into one of two or more valve states. In some implementations the control module may be a standalone module that also communicates with a processor (e.g., see system processor 12 in FIG. 1) and in other implementations the control module may be integrated into a processor that is also used to execute other processing and/or control functions.

Figure 2A:
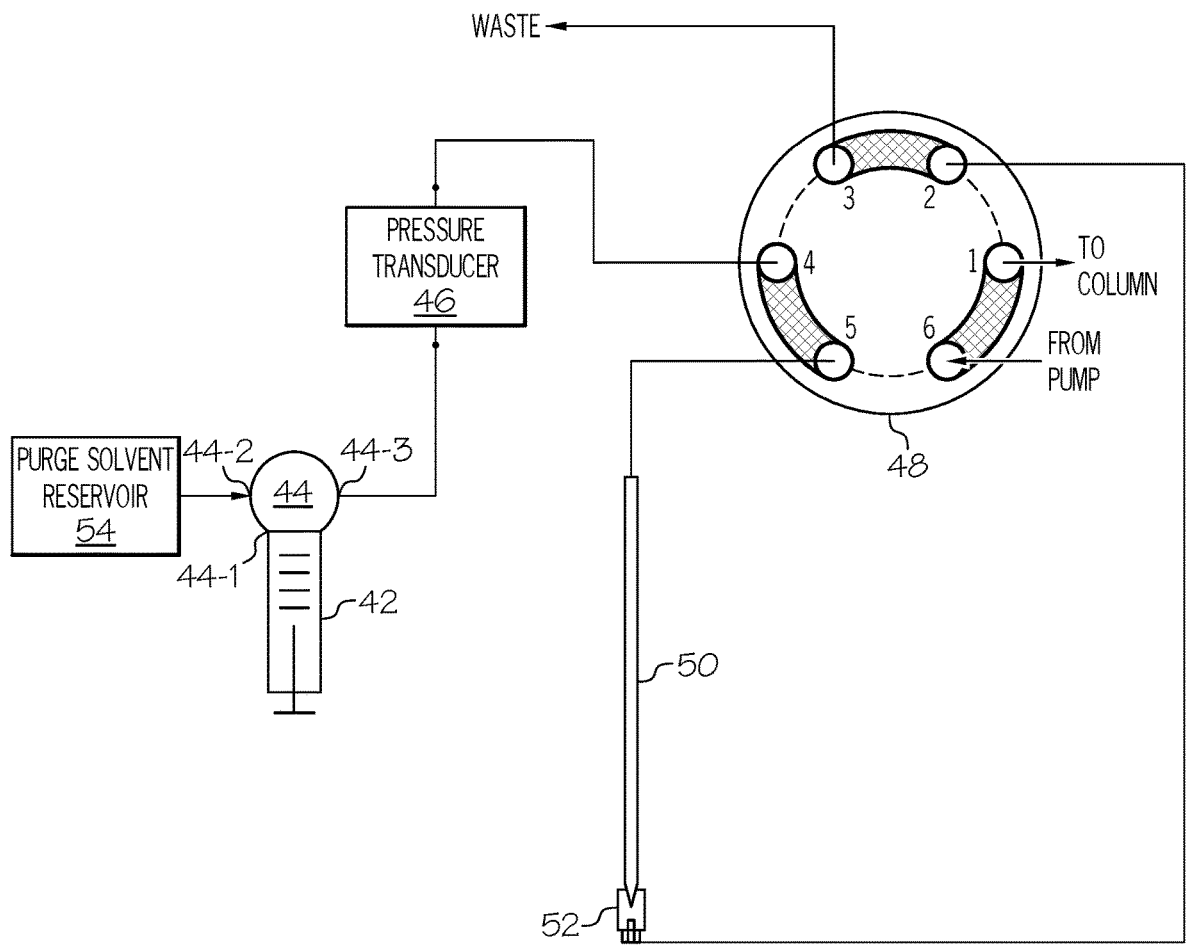
FIGS. 2A, 2B and 2C are schematic diagrams showing different configurations of a conventional fluidic network used to prime a liquid chromatography system and to inject a chromatographic sample.

FIG. 2A is a schematic illustration showing a conventional fluidic network used to prime a liquid chromatography system and to inject a sample into the liquid chromatography system flow. The network includes a metering syringe 42, a metering valve 44, a pressure transducer 46, an injection valve 48, a sample needle 50 and a needle seal 52. The needle seal 52 includes a spring-loaded conical port to receive the conical tip of the sample needle 50 and form a fluid tight seal.

The metering valve 44 includes a first port 44-1 in fluidic communication with the metering syringe 42, a second port 44-2 fluidically coupled to a purge solvent reservoir 54 and a third port 44-3 fluidically coupled to the pressure transducer 46. The metering valve 44 can be configured in a first valve state in which the first and second ports 44-1 and 44-2 are in fluidic communication. The metering valve 44 can be configured in a second valve state in which the first and third ports 44-1 and 44-3 are in fluidic communication.

In one implementation, the injection valve 48 is a six-port rotary shear seal valve. The double arc lines extending between some of the valve ports in the figure indicate internal fluidic paths between the ports. For example, the double arc lines may represent channels formed in the rotor and/or the stator of the rotary shear seal valve that are used to establish internal fluidic communication between two or more of the valve ports. During purge and sample load operations, the injection valve 48 is configured in a first valve state as shown in the figure. The digit n shown on the valve 48, where n has a value of 1, 2, 3, 4, 5 or 6, is used to indicate a particular valve port 44-*n*.

To purge the fluidic paths, the metering valve 44 is configured in the first valve state and the syringe 44 operates to drawn in purge solvent from a solvent reservoir 54. Subsequently, the metering valve 44 is switched to the second valve state and the purge solvent is pushed from the syringe 42 into the fluidic path through the pressure transducer 46 toward the injection valve 48. This sequence of drawing purge solvent through the first port 44-1 when the metering valve 44 is in the first valve state and pushing the solvent out through the third port 44-3 when the metering valve 44 is in the second valve state can be repeated until the volume of purge solvent pushed from the metering valve 42 exceeds the total volume of the fluidic paths that pass from the metering valve 44, through the injection valve 48 and sample needle 50, and out to waste. In some implementations, the volume of purge solvent supplied may be substantially larger than the total volume of the fluidic paths. In other implementations, the sample needle 50 may be removed from and positioned remote to the needle seal 52, for example, positioned to dispense to waste, and the purge process is therefore only applied to the fluidic path from the metering valve 44 through the tip of the sample needle 50.

Figure 2B:
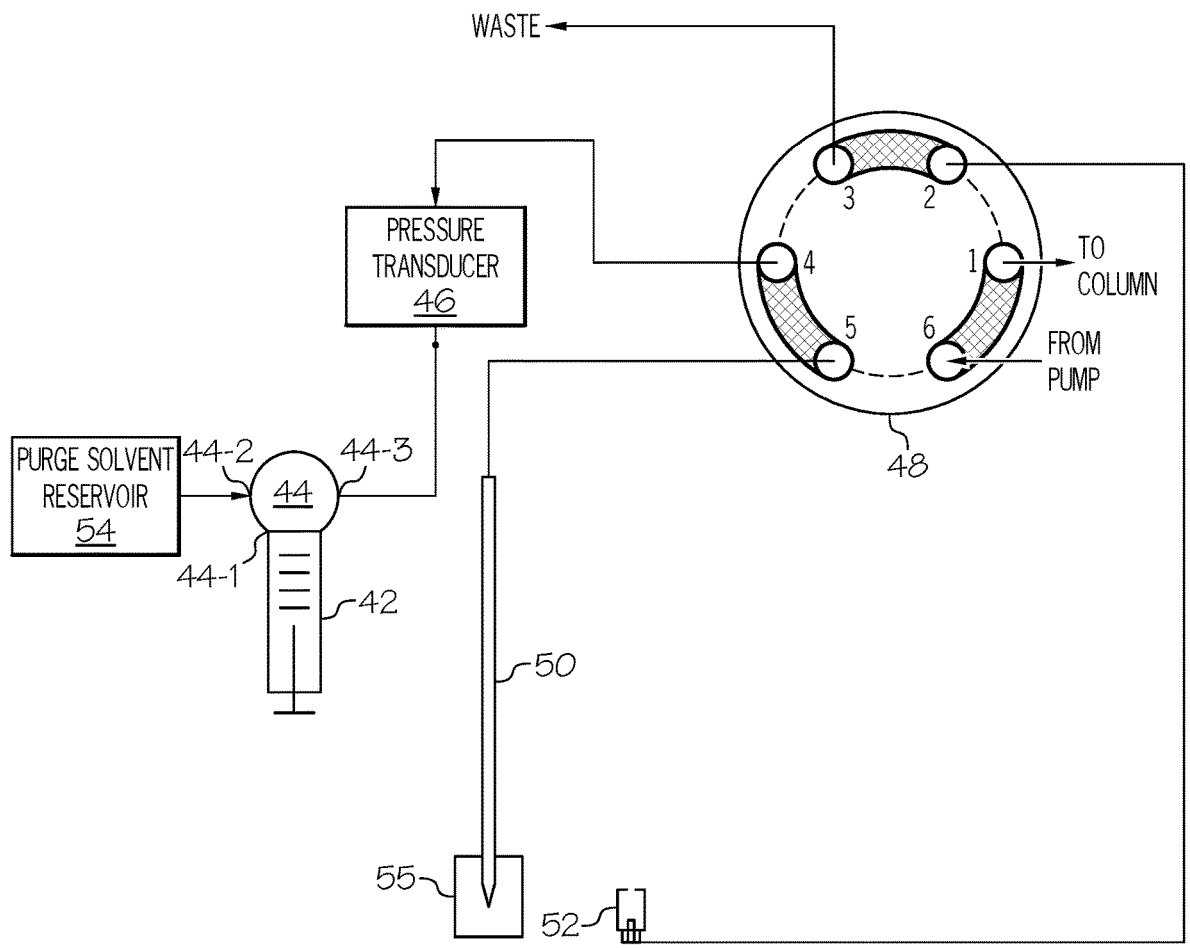

To acquire sample, the sample needle 50 is removed from the needle seal 52 and moved to a source of sample (e.g., a sample vial) 55 as shown in FIG. 2B. The syringe valve 44 is configured in the second valve state and the metering syringe 42 is operated to draw in liquid through the metering valve 44 to cause sample to be drawn from the sample vial 55 into the sample needle 50. Generally, the volume of sample aspirated into the sample needle 50 is accurately controlled by the metering syringe 42; however, any bubbles present in the solvent in the fluidic path between the metering syringe 42 and the tip of the sample needle 50 prior to aspiration can cause the volume of sample acquired to be different from the draw stroke volume of the metering syringe 42. Moreover, the repeatability of the volumes of acquired samples may be adversely affected by the presence of the bubbles.

Figure 2C:
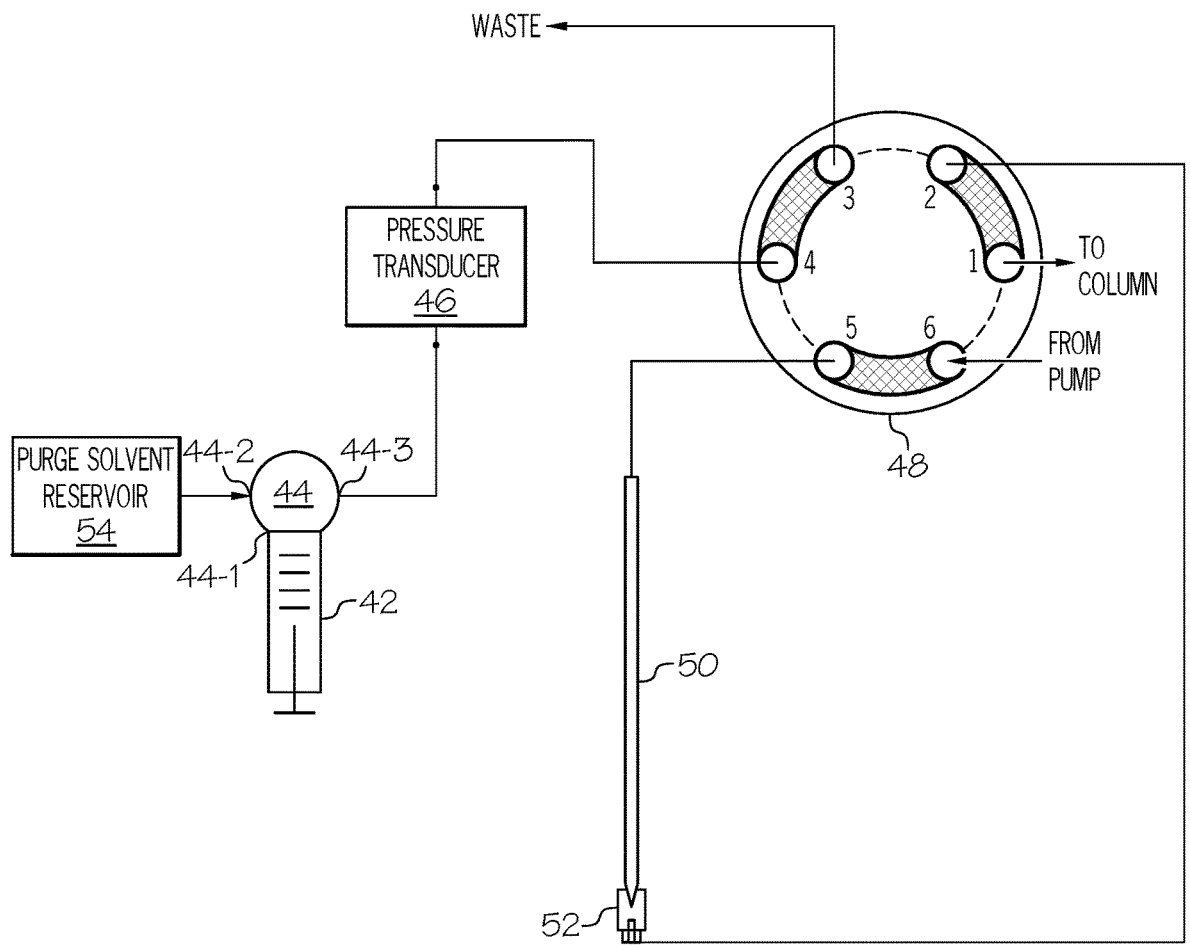

To inject the acquired sample into the chromatography system flow, the injection valve 48 is switched to the second valve state as shown in FIG. 2C in which port 48-1 is coupled to port 48-2, port 48-3 is coupled to port 48-4, and port 48-5 is coupled to port 48-6. Thus, the system flow arriving at port 48-6 of the injection valve 48 exits at port 48-5, flows through the sample needle 50 and needle seal 52, into port 48-2 and out from port 48-1 of the injection valve 48 toward the chromatography column.

The illustrated fluidic network has advantages. Only one high-pressure valve is required and the network does not add substantially to the delay volume of the liquid chromatography system. In addition, multiple cycles of the metering syringe 42 can be used to acquire larger sample volumes.

The purge process occurs under atmospheric pressure and, in some instances, bubbles present in the fluidic paths may not be sufficiently removed. Large volumes of purge solvent may be used to further reduce the air in the fluidic paths; however, this may require a large number of cycles of the metering syringe 42 and syringe valve 44 and can add significant time to the purge process.

Figure 3A:
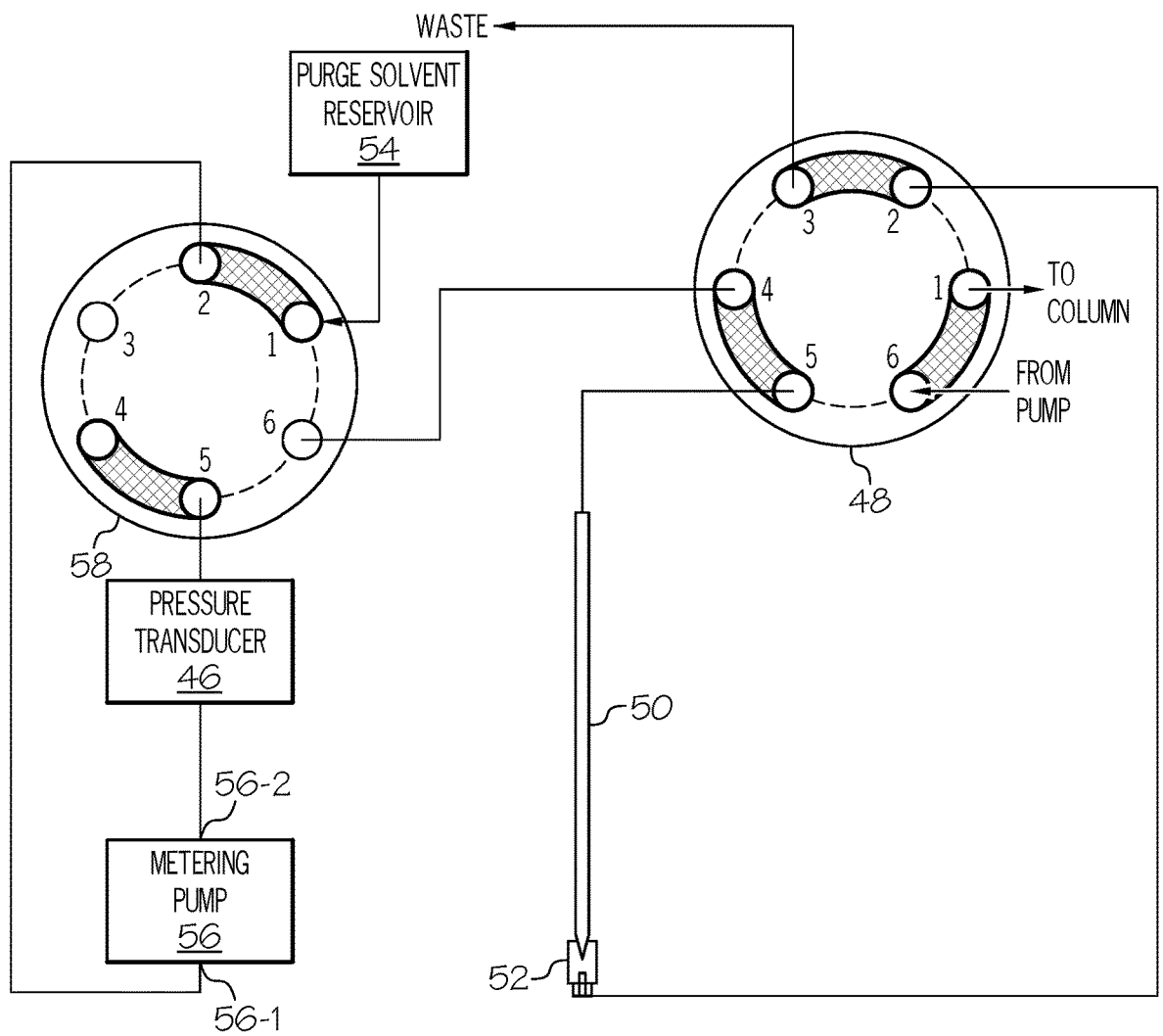
FIGS. 3A, 3B, 3C and 3D are schematic diagrams showing different configurations of a fluidic network that can be used for low-pressure metering and injection of a chromatographic sample.

FIG. 3A shows another fluidic network that can be used for low-pressure metering of a chromatographic sample. The injection valve 48, sample needle 50 and needle seal 52 are configured as described above with respect to FIGS. 2A to 2C; however, there is no metering syringe and no metering valve. The network instead includes a metering pump 56 and a second valve 58 having six ports and shown configured in a first valve state. The metering pump 56 and pressure transducer 46 are in serial fluidic communication and are collectively referred to as a metering pump module.

As used herein, a "metering pump" means any pump capable of delivering a precise volume of liquid over a specified time. By way of one non-limiting example, a metering pump can be a positive displacement pump, such as a single piston pump, that is compatible with chromatographic solvents and which has a piston chamber and two fluid lines each extending from a respective pump port to the piston chamber. The illustrated metering pump 56 has a plunger, a first port 56-1 and a second port 56-2. The metering pump 56 does not include check valves and can be configured such that the first port 56-1 is an inlet and the second port is an outlet or alternatively configured such that the first port 56-1 is an outlet and the second port 56-2 is an inlet. Preferably, the metering pump 56 has a displacement volume that is greater than the fluid volumes of any of the fluidic paths. The metering pump 56 may utilize a linear actuator capable of operating under high pressures with precise volume control per actuator steps. Alternatively, the metering pump 56 may utilize a lead-screw or ball-screw actuator for low cost and high reliability. Advantageously, the metering pump 56 can be controlled to acquire and dispense accurate volumes of samples and solvents. The second valve 58 has ports 58-3 and 58-4 blocked so that no fluid enters or exits those ports. In effect, the blocked ports allow the second valve 58 to perform as a pair of check valves for the metering pump 56.

Figure 3B:
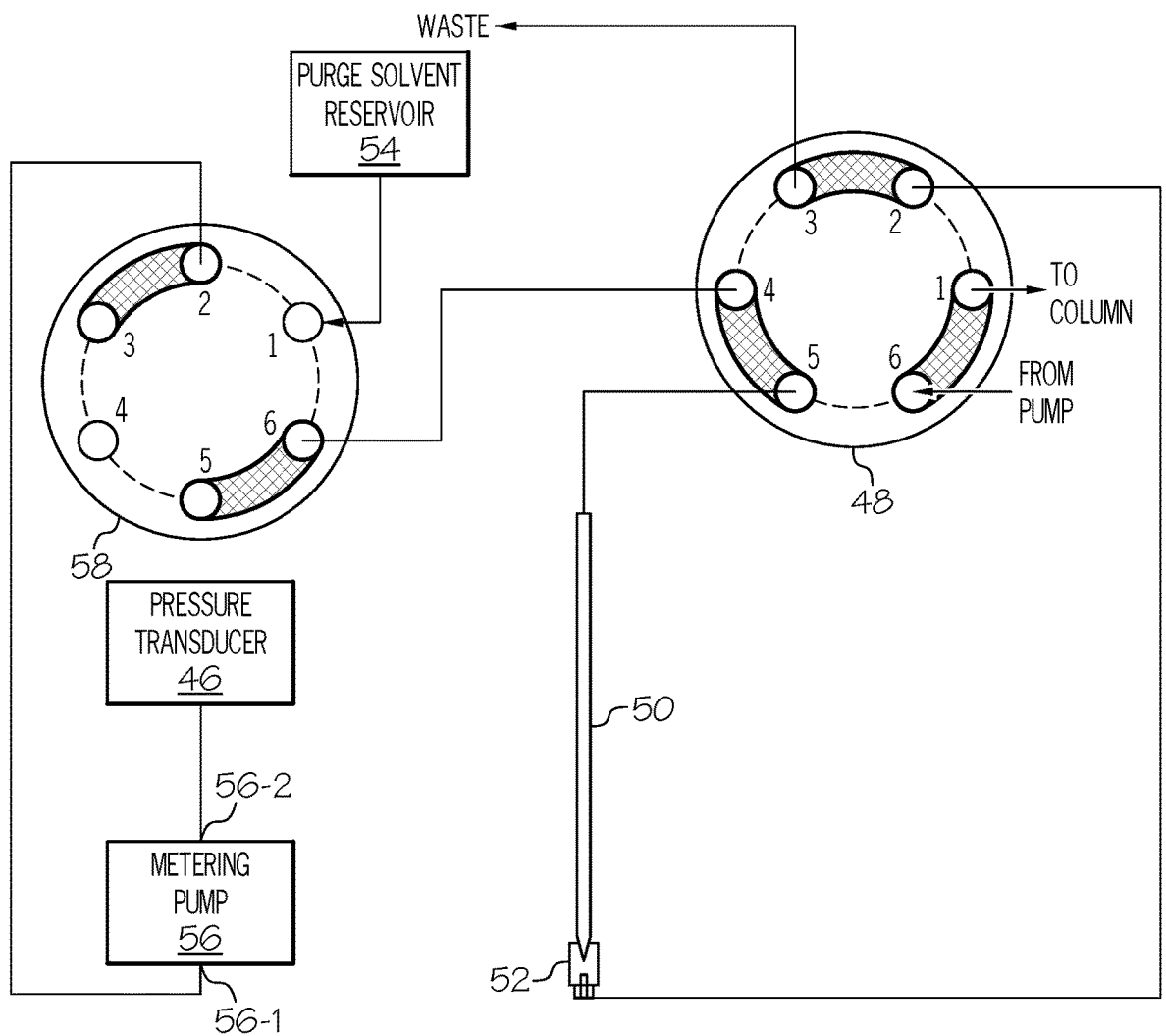

When purging the fluidic paths, the second valve 58 is configured in a first valve state as shown in the figure in which port 58-1 is coupled to port 58-2 and port 58-4 is coupled to port 58-5 while the fluidic path from the pressure transducer 46 is dead-ended at port 58-4. Thus, a fluidic path exists between the purge solvent reservoir 54 and the first port 56-1 of the metering pump 56. The second valve 58 is then switched to the second valve state, as shown in FIG. 3B, so that solvent dispensed from the metering pump 56 during a discharge stroke purges the fluidic path extending from port 56-2 through the pressure sensor 46, second valve 58, injection valve 48 and sample needle 50. If the sample needle is positioned as shown in the needle seal 52, then the fluidic path from the needle seal 52 through ports 48-2 and 48-3 of the injection valve 48 can also be purged. Conversely, if the sample needle is not inserted into the needle seal 52 but is positioned to dispense to waste, only the fluidic path leading up to and through the sample needle 50 is purged.

Similar to the fluidic network of FIGS. 2A to 2C, many cycles of the metering pump 56 and second valve 58 may be required to complete the purge, adding to the time required to prepare the liquid chromatography system for a separation. Moreover, because the purging is performed at atmospheric pressure, bubbles present in the fluidic paths may not be purged, for example, due to surface tension. The fluidic paths where bubbles may remain include the narrow channels extending between the plunger chamber and the ports 56-1 and 56-2 in the metering pump 56.

Figure 3C:
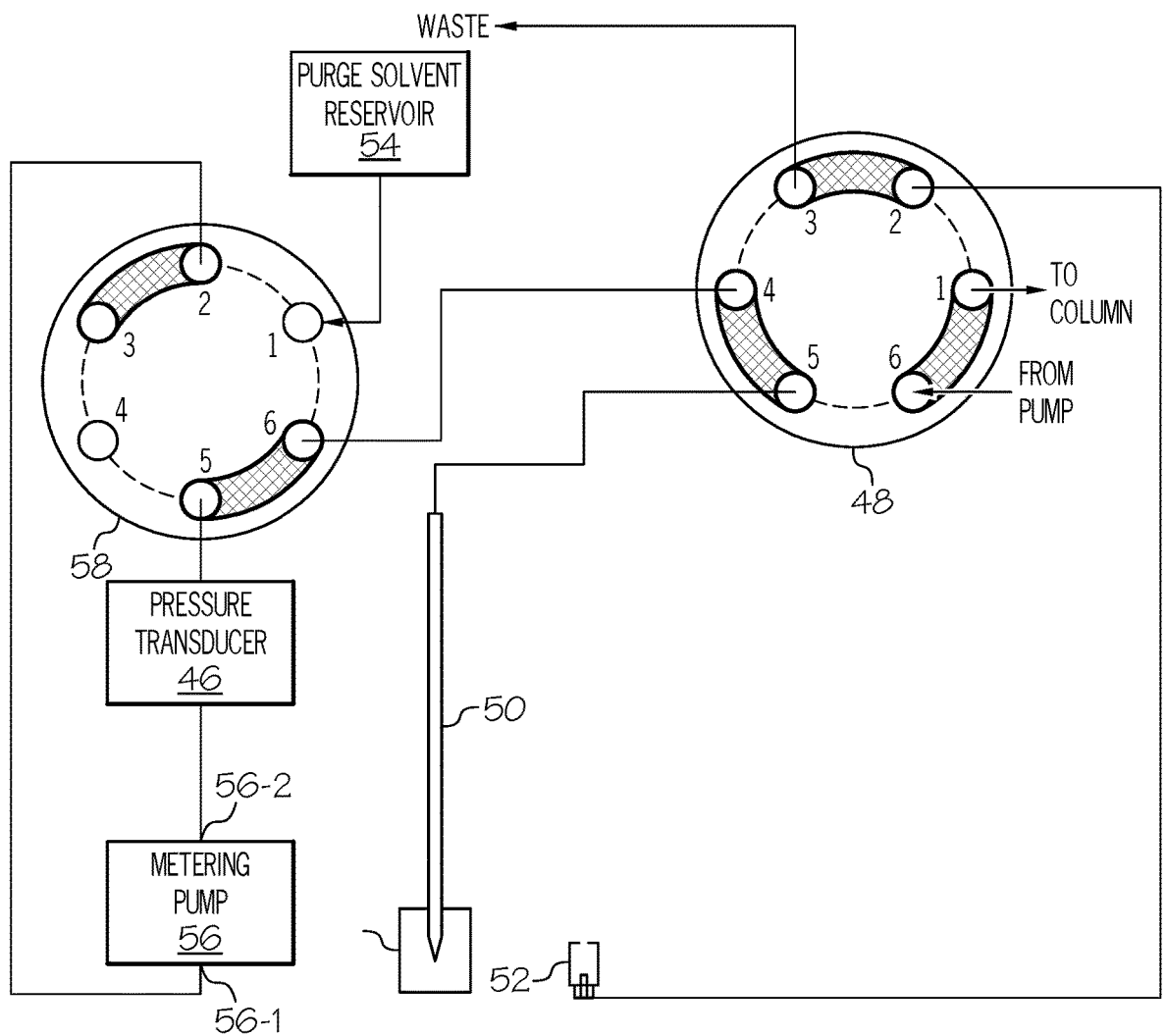

FIG. 3C depicts the fluidic network for a sample load operation. The sample needle 50 is positioned so that at least the needle tip is disposed in a sample vial 55 while the injection valve 48 is in its first valve state and the second valve 58 is in its second valve state. Consequently, an intake stroke of the plunger in the metering pump 56 draws liquid into the second pump port 56-2. This liquid is drawn from the sample needle 50 so that sample from the sample vial 55 is drawn into the sample needle 50.

Figure 3D:
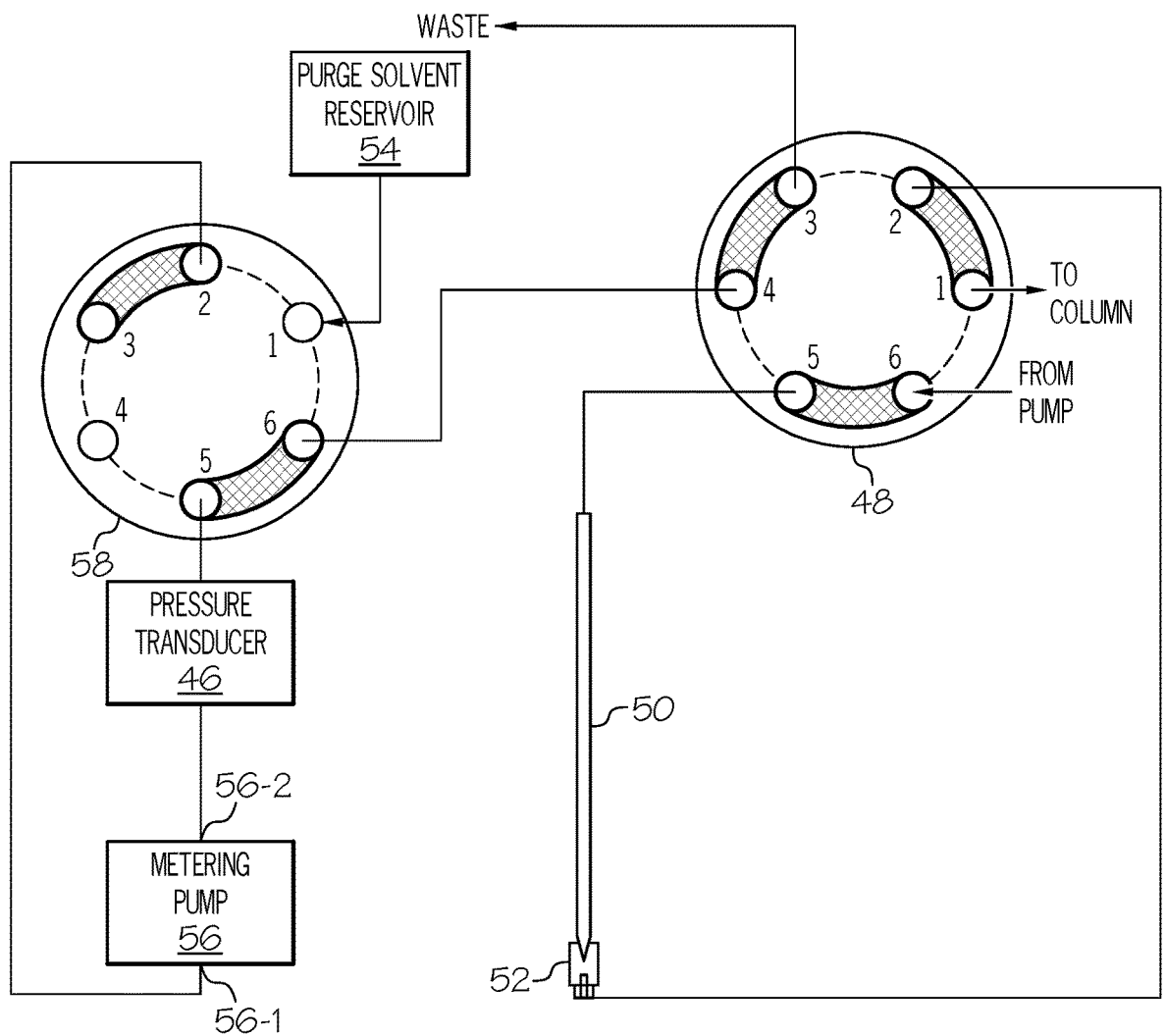

To inject the acquired sample into the chromatography system flow, the injection valve 48 is switched to the second valve state as shown in FIG. 3D so that the system flow arriving at port 48-6 of the injection valve 48 exits at port 48-5, flows through the sample needle 50 and needle seal 52, into port 48-2 and out from port 48-1 of the injection valve 48 toward the chromatography column.

Figure 4A:
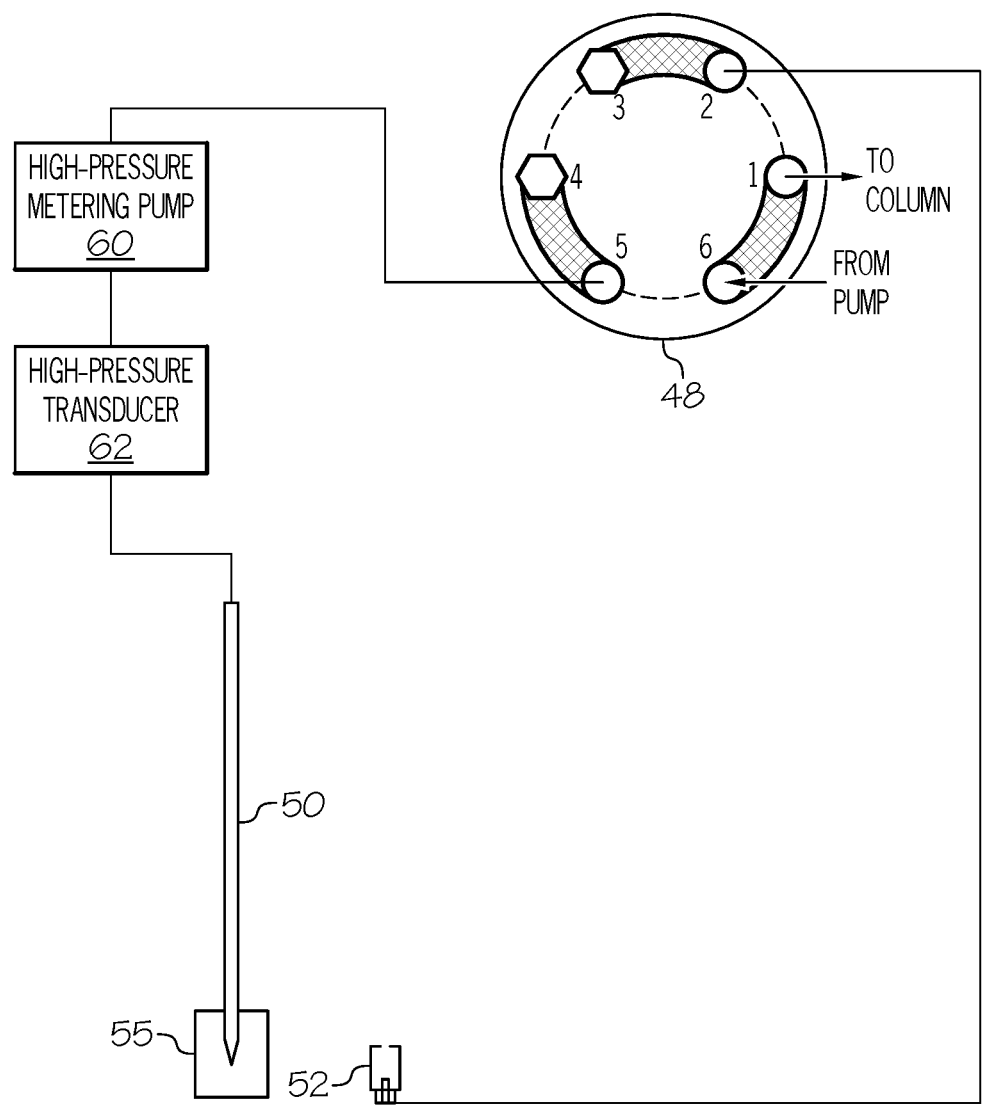
FIGS. 4A, 4B and 4C are schematic diagrams showing different configurations of a high-pressure fluidic network for acquiring and injecting a chromatographic sample.
Figure 5:
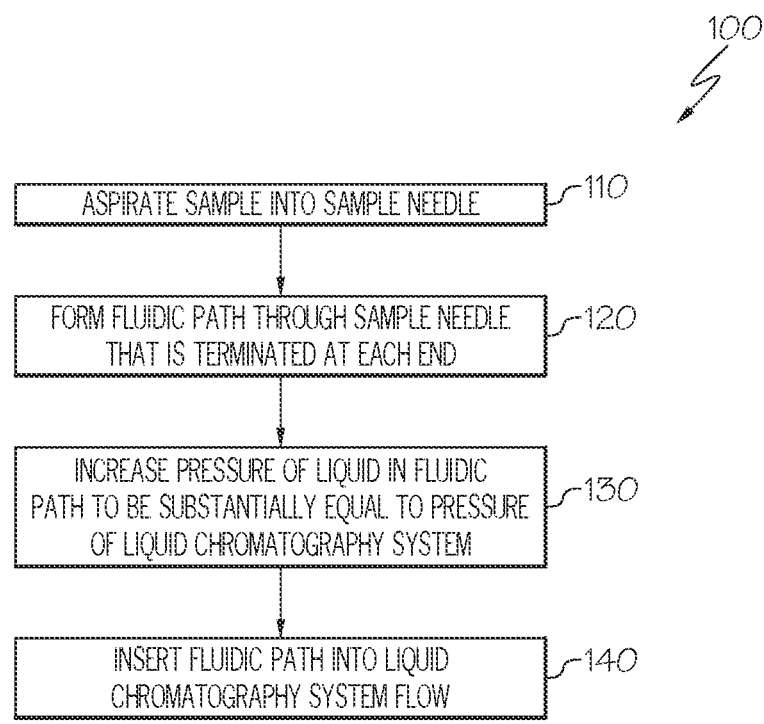
FIG. 5 is a flowchart representation of an example of a method for injecting a chromatographic sample into a chromatography system flow.

FIG. 4A is a schematic diagram showing a high-pressure fluidic network for acquiring and injecting a chromatographic sample. Reference is also made to FIG. 5 which shows a flowchart representation of an example of a method 100 for injecting a chromatographic sample into a chromatography system flow. The fluidic network includes an injection valve 48, a high-pressure metering pump 60, a high-pressure pressure transducer 62, a sample needle 50 and needle seal 52. Ports 48-3 and 48-4 of the injection valve 48 are blocked. The high-pressure metering pump 60 is operable to generate fluidic pressures that exceed 7 MPa (1,000 psi) and, in some implementations, operates to generate fluidic pressures that exceed 70 MPa (10,000). The high-pressure pressure transducer 62 is preferably capable of measuring pressures that exceed 7 MPa (1,000 psi) and, in some implementations, measures pressures that exceed 70 MPa (10,000 psi). In other implementations the metering pump 60 and high-pressure pressure transducer 62 generate and measure pressures that exceed 125 MPa (18,000 psi). The high-pressure metering pump 60 and high-pressure pressure transducer 62 are in serial fluidic communication and are collectively referred to as a metering pump module.

Figure 4B:
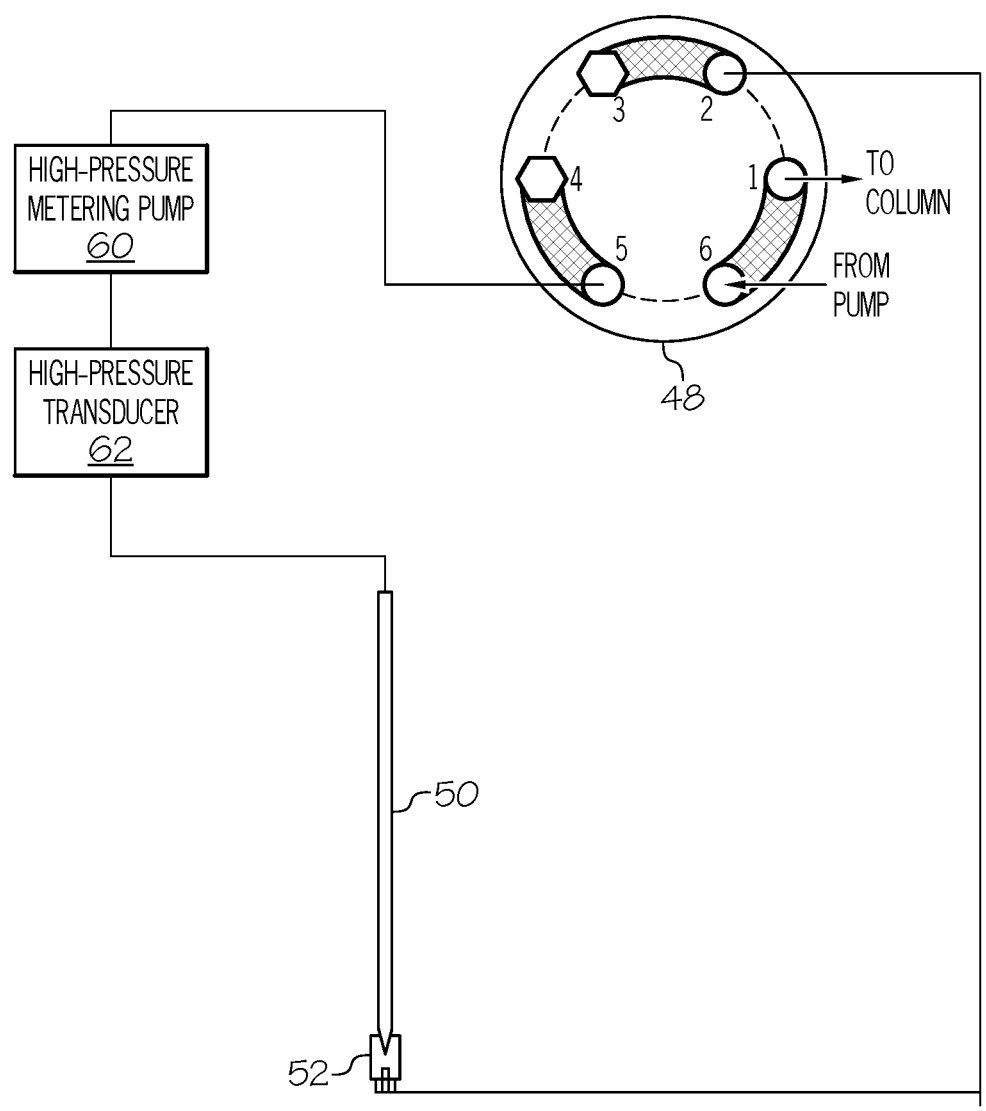
Figure 4C:
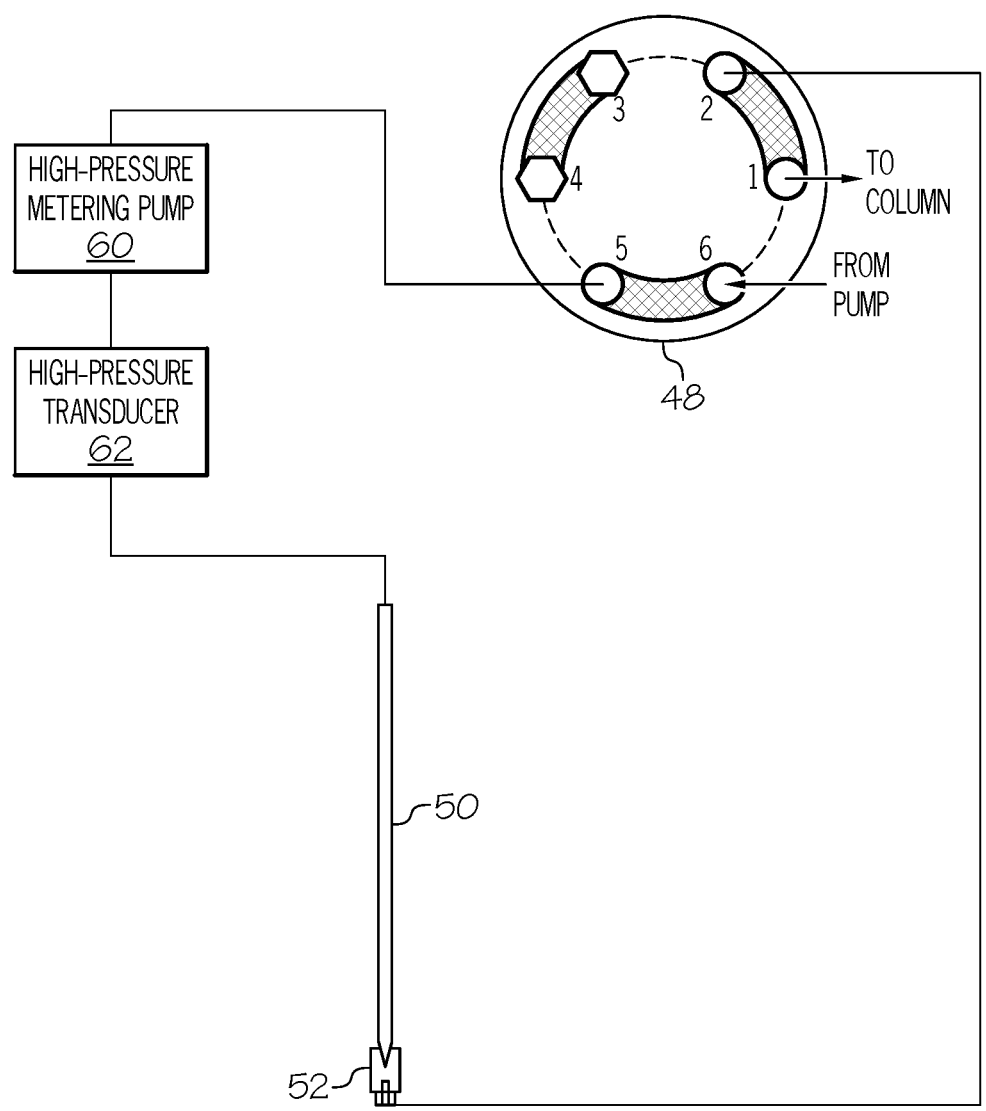

A chromatographic sample is acquired (step 110) by positioning the tip of the sample needle 50 in a sample source such as a sample vial 55. The sample is acquired under atmospheric pressure by retracting the plunger of the metering pump 60 so that sample is drawn through the needle tip into the sample needle 50 toward the metering pump 60. In this single valve fluidic network no multiple draws (plunger cycles) can be made and the maximum sample volume that can be acquired is limited by the volume of a pump displacement stroke. Once the desired volume of sample is acquired, the tip of the sample needle 50 is moved into the needle seal 52 as shown in FIG. 4B to form (step 120) a fluidic path through the sample needle 50 that is terminated (blocked) at each end. The metering pump 60 is then operated to pre-compress (step 130) the liquid in the fluidic path defined between the two blocked ports 48-3 and 48-4 of the injection valve 48. The pressure of the pre-compressed liquid is monitored using the high-pressure transducer 62. When the measured pressure of the pre-compressed liquid is substantially equal (e.g., within 10%) to the liquid chromatography system pressure, the injection valve 48 is switched to a second valve state as shown in FIG. 4C such that port 48-1 is coupled to port 48-2 and ports 48-5 is coupled to port 48-6. As illustrated, the system flow into port 48-6 of the injection valve 48 flows out through port 48-5 and through the high-pressure metering pump 60, pressure transducer 62, sample needle 50 and needle seal 52 before passing into port 48-2 and out through port 48-1 of the injection valve 48 to the chromatography column. Thus, the formed fluidic path is inserted (step 140) into the liquid chromatography system flow.

Advantageously, there is no substantial change in the system pressure at the time of injection and only a single valve is required. Moreover, the chromatography system pump can be primed at atmospheric pressure through the sample needle 50 and to waste thereby eliminating the need for a vent valve at the system pump. This allows the flow rate during priming to be substantially greater than the system flow rate used to perform a separation where the system flow passes through the chromatographic column. In one example, the system pump is part of a quaternary solvent manager in which the system pump receives a low-pressure (e.g., atmospheric) flow containing contributions of different solvents from a gradient proportioning valve. Flow from the system pump can similarly be used to prime the high-pressure metering pump 60 at atmospheric pressure with the flow exiting the tip of the sample needle 50 to waste. Another benefit of the illustrated high-pressure fluidic network is that new solvent that has been degassed is constantly provided from the system pump at full pressure and used to push the acquired sample. Consequently, there is no source for bubble formation.

Figure 6A:
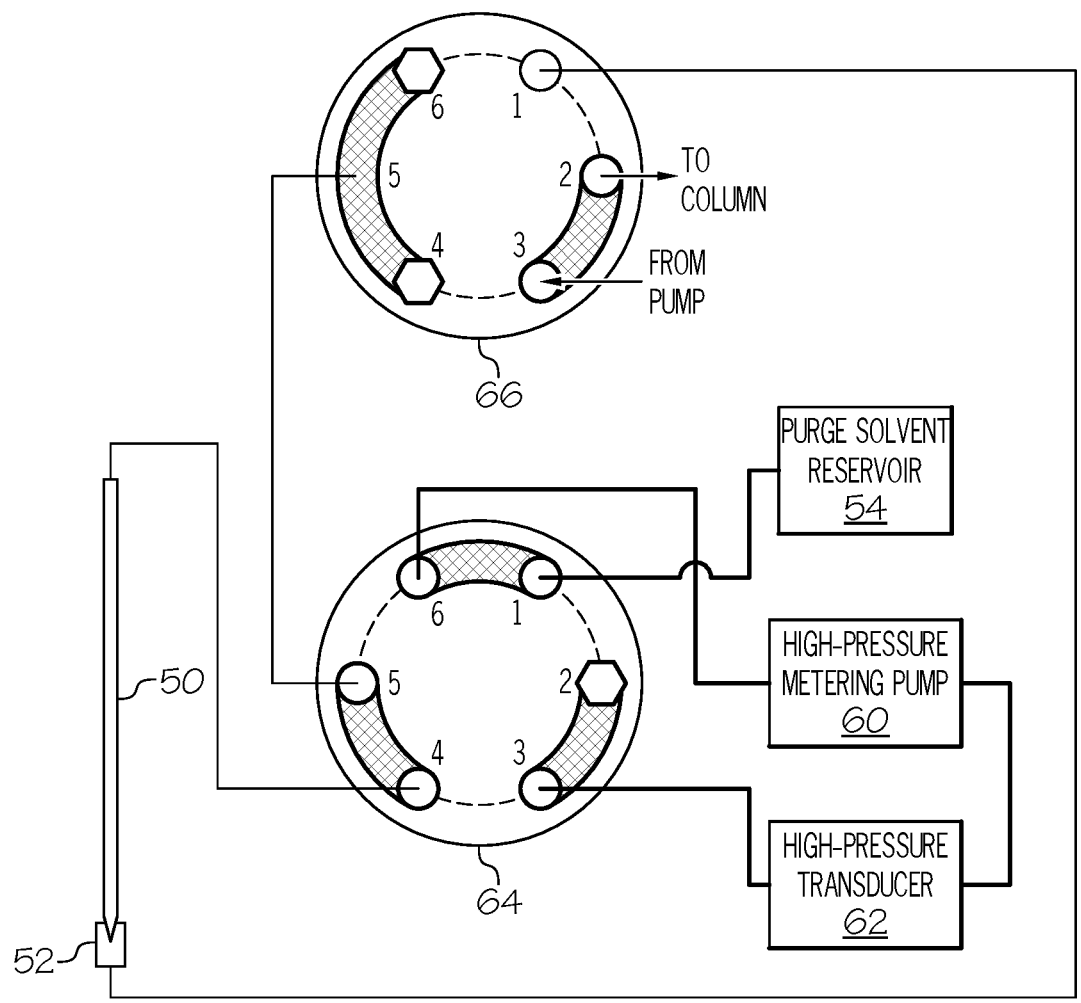
FIGS. 6A, 6B, 6C, 6D and 6E are schematic diagrams showing different configurations of another high-pressure fluidic network for acquiring and injecting a chromatographic sample.

FIG. 6A shows an alternative high-pressure fluidic network which can also be used to dilute a chromatographic sample during injection. The fluidic network includes a high-pressure metering pump 60, high-pressure transducer 62, sample valve 64 and merge valve 66. As used herein, a "merge valve" means any valve that can be used to inject a discrete fluidic plug of sample into the mobile phase of the liquid chromatography system and to alternatively be used to merge a flow of sample with a concurrent flow of mobile phase in the liquid chromatography system to achieve a dilution of the sample. The sample and merge valves 64 and 66 can be configured in different valve states such that the active fluidic paths are determined by the particular valve state of each valve.

The sample valve 64 operates under high system pressure (e.g., pressures that may exceed 18,000 psi (125 MPa)) and is operable in at least two valve states. In some examples, the sample valve 64 is a six-port rotary shear seal valve. Port 64-1 is coupled to a flush solvent reservoir 54, port 64-3 is coupled to a high-pressure transducer 62, port 64-4 is coupled to a sample needle 50, port 64-5 is coupled to the merge valve 66 and port 64-6 is coupled to a metering pump 60. A degasser (not shown) may be provided between the flush solvent reservoir 54 and the sample valve 64. Port 64-2 is fluidically terminated, that is, blocked so that no fluid enters or exits the port. The sample valve 64 is shown in a first (offline) valve state in which ports 64-1 and 64-6 are in fluidic communication, ports 64-2 and 64-3 are in fluidic communication and ports 64-4 and 64-5 are in fluidic communication. The sample valve 64 can be reconfigured to a second (online) valve state in which the internal valve coupling paths are effectively rotated either clockwise (or counterclockwise) by 60° with respect to those shown in the figure. Thus, when the sample valve 64 is in the second valve state, port 64-1 is in fluidic communication with port 64-2, port 64-3 is in fluidic communication with port 64-4 and port 64-5 is in fluidic communication with port 64-6.

The merge valve 66 has six merge valve ports 66-1 to 66-6. Ports 66-4 and 66-6 are terminated so that no fluid can enter or exit these ports. Port 66-1 is fluidically coupled to the needle seal 52, port 66-2 is fluidically coupled to the chromatographic column, port 66-3 is fluidically coupled to a source of mobile phase (e.g., solvent manager 16 in FIG. 1) and port 66-5 is fluidically coupled to port 64-5 of the sample valve 64. The merge valve 66 is configurable in at least three valve states. As illustrated, the merge valve 66 is in a first (bypass) valve state in which ports 66-2 and 66-3 are in internal fluid communication with each other so that the chromatography system flow entering at port 66-3 can exit at port 66-2 and flow to the chromatographic column. The merge valve 66 is also configurable in two other valve states, a dilution state and a gradient state, as discussed further below with respect to FIG. 6D and FIG. 6E, respectively.

As illustrated, the sample valve 64 is in the first valve state and the merge valve 66 is in the bypass state. Bold lines in the figure and in subsequent figures indicate active fluidic paths. A flow of mobile phase passes through the merge valve 66 to the chromatographic column. The metering pump 60 is operated to draw in liquid under atmospheric pressure. As described above, port 64-2 on the sample valve 64 is terminated therefore operation of the metering pump 60 results in purge solvent being aspirated from the purge solvent reservoir 54. The volume of aspirated purge solvent is accurately controlled and pre-fills the metering pump 60 with a volume of purge solvent that is slightly greater that the volume of sample to be injected into the mobile phase. By way of a non-limiting numerical example, a 24 µL volume of flush solvent may be aspirated for a 20 µL volume sample injection.

Figure 6B:
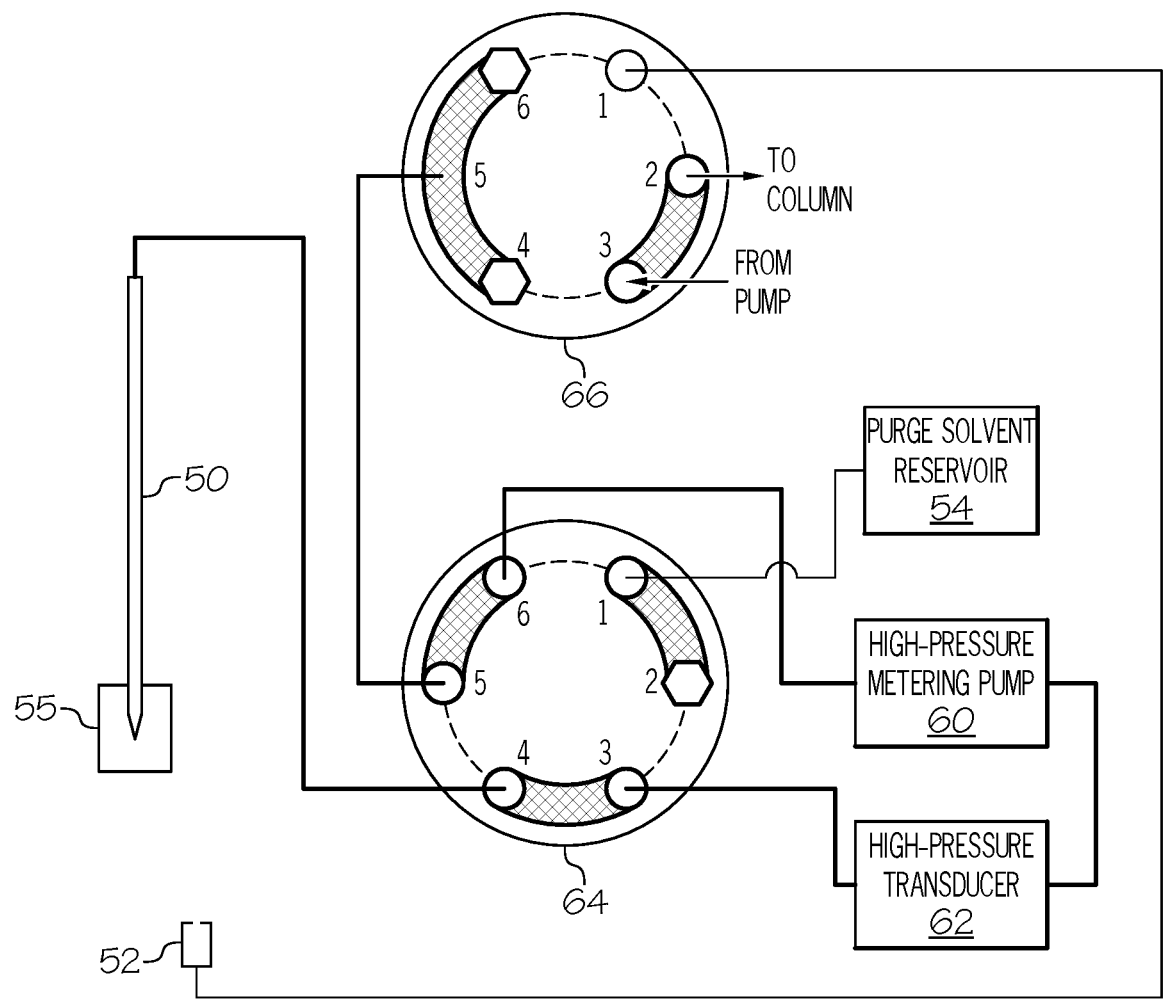

To load the sample, the sample valve 64 is reconfigured to the second (online) valve state as shown in FIG. 6B. Thus the metering pump 60 is terminated at the left side due to the terminations at ports 66-4 and 66-6 of the merge valve 66 and the right side of the metering pump 60 communicates with the sample needle 50. In this fluidic network, the metering pump 60 is operated to continue to draw in liquid under atmospheric pressure which results in sample being aspirated into the sample needle 50 from a sample vial 55. The volume of aspirated sample is accurately controlled by the operation of the metering pump 60. The extra volume of acquired purge solvent relative to the acquired volume of sample is used to ensure in a later step that the acquired sample is fully pushed through the volume of the fluidic path between the acquired solvent in the sample needle 50 and the location of merging with the mobile phase at the merge valve 66, and to accommodate dispersion in the fluidic path.

Figure 6C:
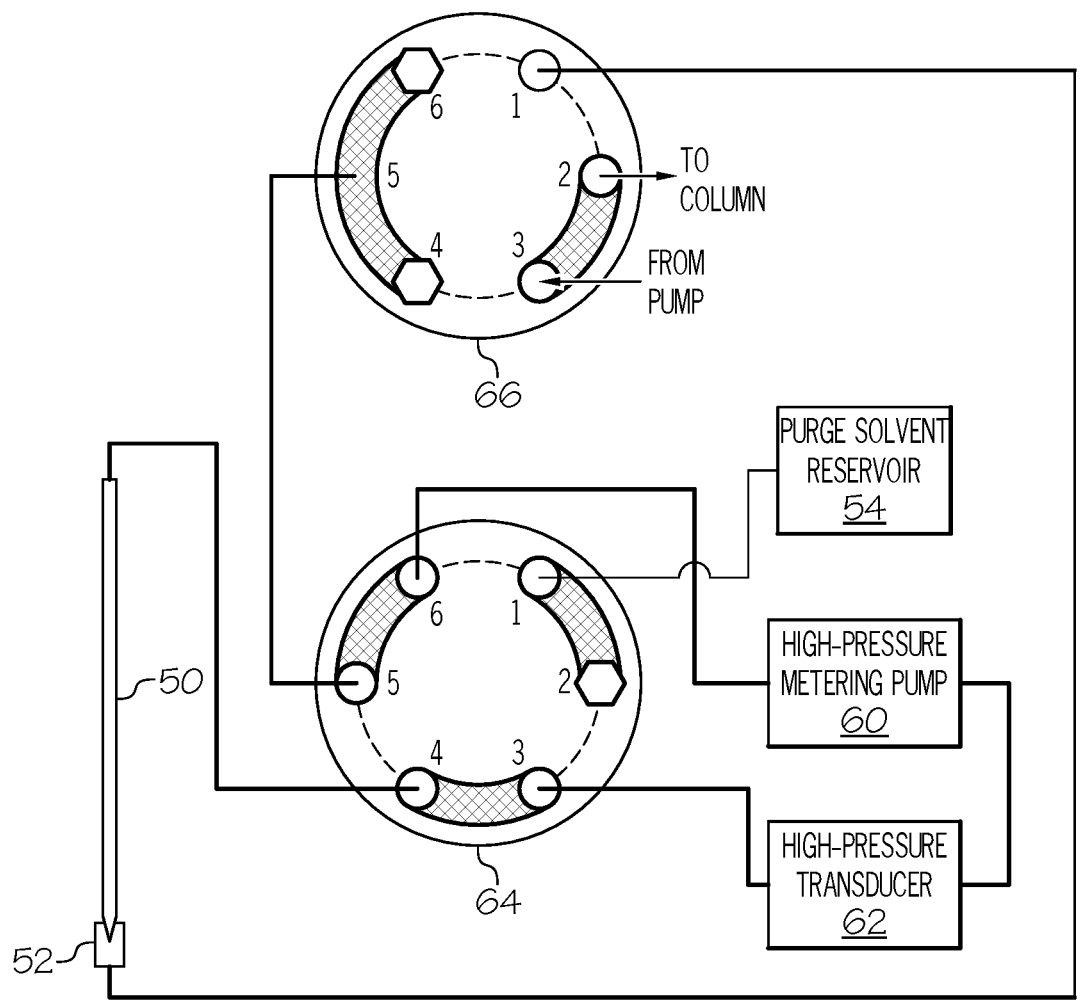

FIG. 6C shows the portion of the liquid chromatography system after the sample needle 50 is moved from the sample vial 55 to the needle seal 52 while the valve states of the sample valve 64 and merge valve 66 remain unchanged. The fluidic path from the left side of the metering pump 60 remains terminated at the merge valve 66 and the fluidic path from the right side of the metering pump 60 through the pressure transducer 62, sample valve 64 and sample needle 50 is also terminated at the merge valve 66 as the valve port 66-1 is not coupled to another valve port. The metering pump 60 is then controlled to push liquid out so that both fluidic paths are brought up to the full system pressure. Pressure transducer 62 is used to confirm that system pressure has been reached.

Figure 6D:
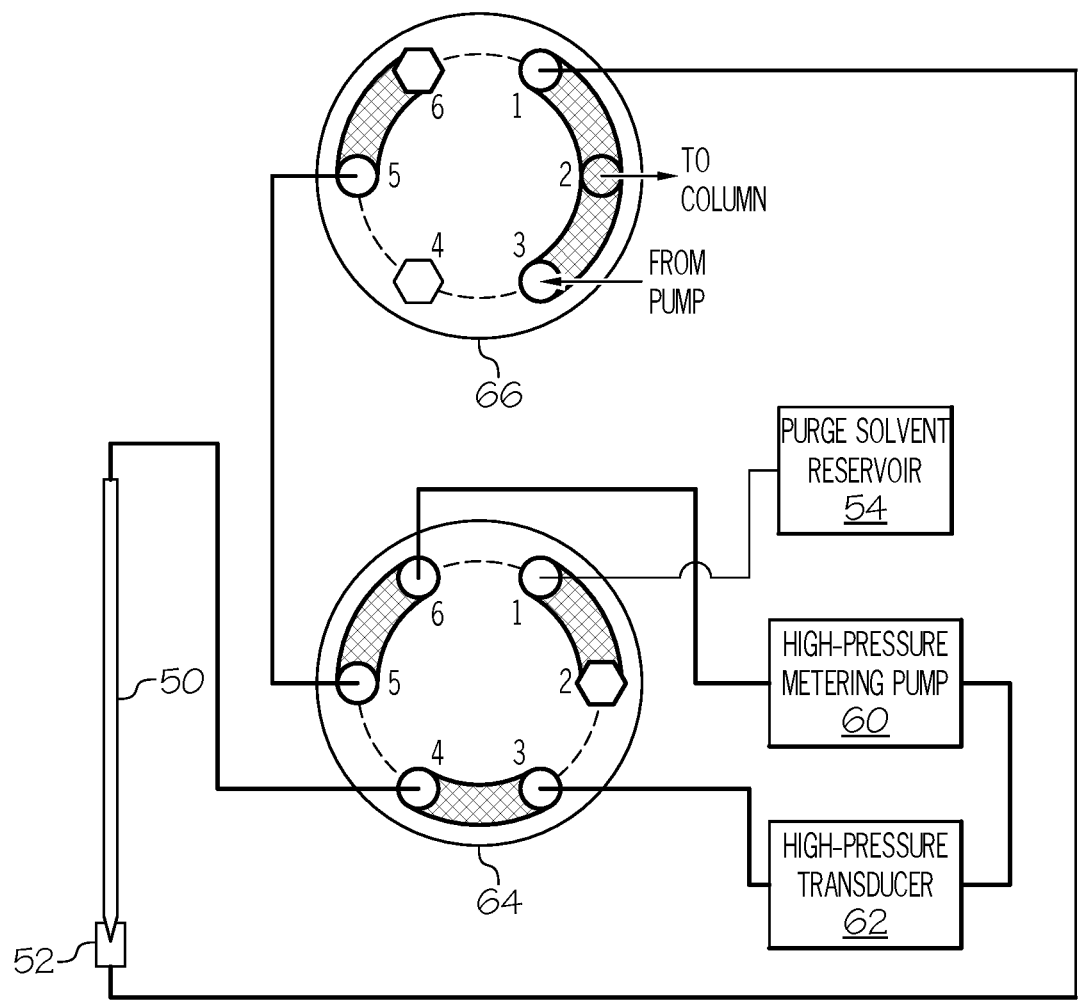

Subsequently, the merge valve 66 is reconfigured to a second (dilution) valve state as shown in FIG. 6D. Continued operation of the metering pump 60 to dispense liquid results in the acquired sample flowing from the sample needle 50 through the needle seal 52 and then though port 66-1 of the merge valve 66. A small volume of solvent in the fluid lines is first merged with the flow of mobile phase received at port 66-3 before the sample plug arrives at port 66-3 and is merged with the mobile phase. The sample plug exiting the merge valve 66 at port 66-2 is merged with concurrently flowing mobile phase also exiting at port 66-2. To maintain a constant system flow to the chromatographic column, the flow rate from the mobile phase source is decreased while the flow rate from the metering pump 60 is increased. As both the flow of mobile phase and the flow of the sample contribute to the system flow throughout the duration of the sample injection and dilution, the sample dilution ratio is determined by the two flow rates. By way of a non-limiting numerical example, if the mobile phase flow rate at port 66-3 is nine times the sample flow rate at port 66-1, the sample concentration in the flow exiting at port 66-2 is effectively one-tenth the original sample strength (i.e., the dilution ratio is one-part sample to nine parts diluent (mobile phase)). It will be recognized that a wide range of dilution ratios are possible.

Some of the solvent in the fluidic path used to "push" the sample plug is allowed to merge with the mobile phase for a time sufficient to ensure that substantially all the sample has been merged with the mobile phase. Subsequently, the flow rate from the mobile phase source is increased while the flow rate from the metering pump 60 is decreased in a complementary manner to maintain a constant system flow rate to the chromatographic column. "Substantially all the sample" means that any sample remaining in the illustrated fluidic paths is of insignificant volume as to not adversely affect chromatographic results.

Figure 6E:
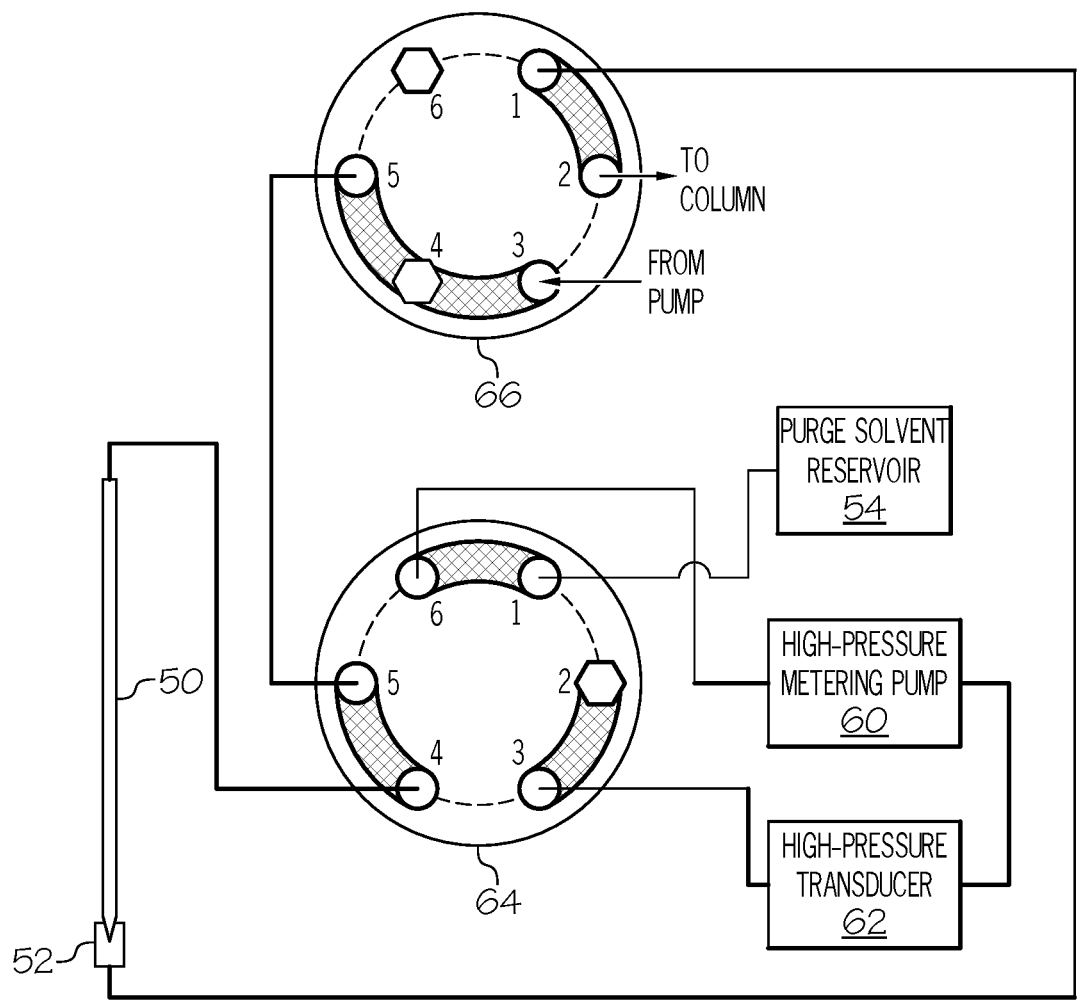

Referring to FIG. 6E, the sample valve 64 is reconfigured to the first (offline) valve state, thereby disconnecting fluid communication between the metering pump 60 and the sample needle 50. In addition, the merge valve 66 is reconfigured to a third (gradient) valve state such that the mobile phase received at port 66-3 of the merge valve 60 flows out from port 66-5, through the sample valve 64, sample needle 50 and needle seal 52 before returning at port 66-1 and flowing out port 66-2 to the column. The two valves 64 and 66 remain in the illustrated fluidic network for the remainder of the gradient chromatographic separation. The fluidic path through the inside of the sample needle 50 may be cleaned after completion of the separation by passing the mobile phase through the sample needle 50.

The fluidic network of FIGS. 6A to 6E can be used with some types of samples to dilute a large volume of the sample during the merging with the mobile phase, including sample volumes that are larger than the displacement volume of the metering pump 60. By way of a non-limiting numerical example, a metering pump having a 100 µL displacement volume can be used to dilute a 1 mL sample volume by consecutively merging smaller volume (e.g., 100 µL or less) sample plugs with the mobile phase. To do this, a smaller volume sample plug is aspirated into the sample needle 50 and subsequently merged into the flow of mobile phase according to the operation of the metering pump 60 and reconfiguration of the sample valve 64 and merge valve 66 described above. This process of merging a smaller volume sample plug with the mobile phase is repeated a number of times so that the total of the volumes of the smaller sample plugs merged into the mobile phase equals to the full sample volume. The effective dilution ratio is determined by the relative flow rates of the mobile phase and the smaller volumes of sample during the merge times.

One advantage of the fluidic network is that the metering pump 60 can be quickly primed using the system flow. For example, the system flow may be a binary or quaternary solvent flow. Another advantage is the ability to perform multiple draw cycles for acquiring sample. In addition, the fluidic path that includes the metering pump 60 and high-pressure transducer 62 is only part of the system path during the injection sequence and therefore this fluidic path does not add to the gradient delay. Still another advantage is that the fluidic network allows for sample dilution without sacrificing the ability to inject sample without dilution.

Figure 7A:
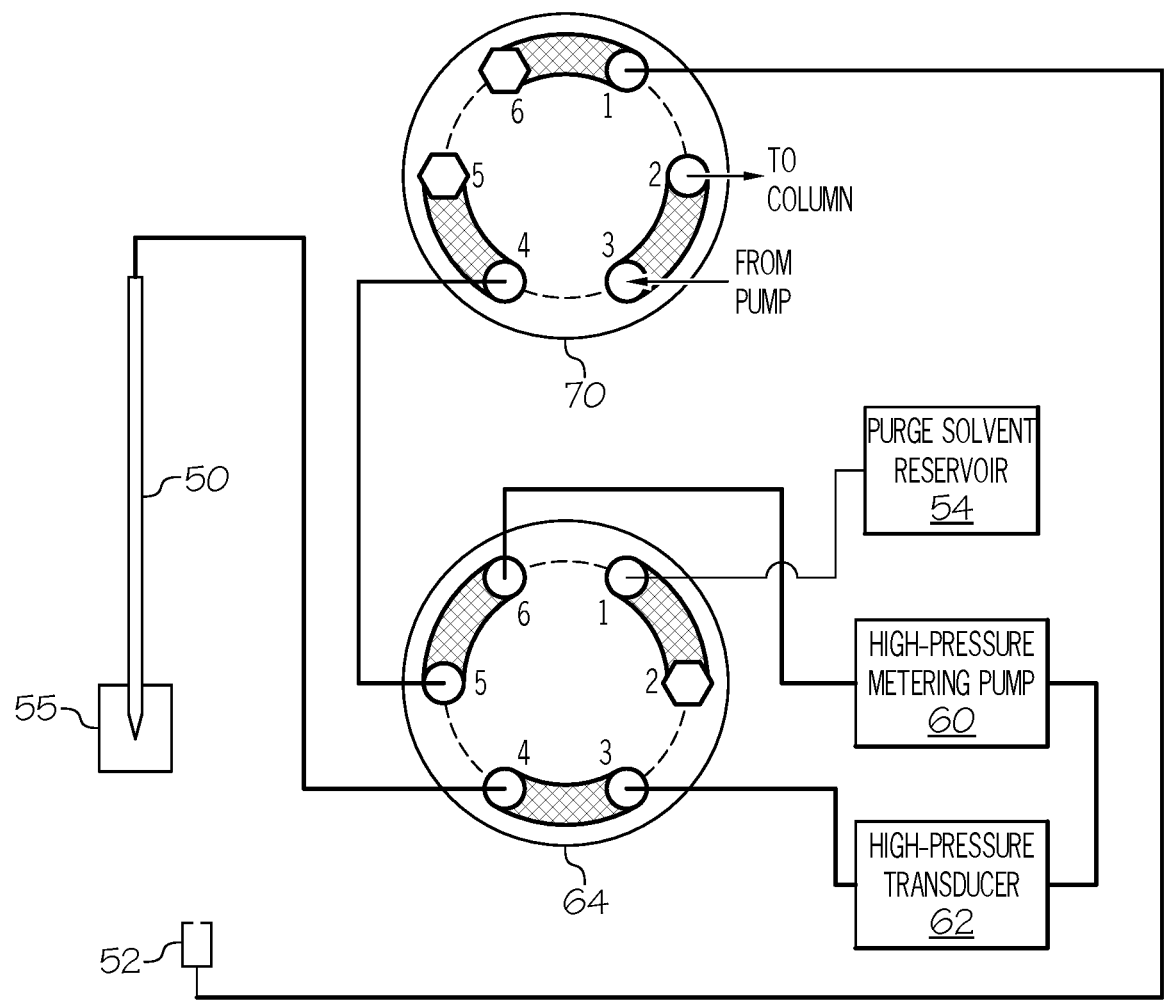
FIGS. 7A, 7B, 7C, 7D and 7E are schematic diagrams showing different configurations of still another high-pressure fluidic network for acquiring and injecting a chromatographic sample.

FIG. 7A shows another high-pressure fluidic network for acquiring and injecting a chromatographic sample. The fluidic network does not support online dilution; however, the ability to acquire a large volume of sample using multiple intake strokes of the metering pump 60 is maintained. The fluidic network is configured similarly to the fluidic network depicted in FIGS. 6A to 6E and can be used to perform the method 100 of FIG. 5; however, instead of using the merge valve 66, a merge valve 70 having a different configuration of internal fluidic coupling paths is used. More specifically, all the internal coupling paths along the rotor surface between valve ports are of equal length. The merge valve 70 can be identical in structure to the sample valve 64 but this is not a requirement.

Figure 7B:
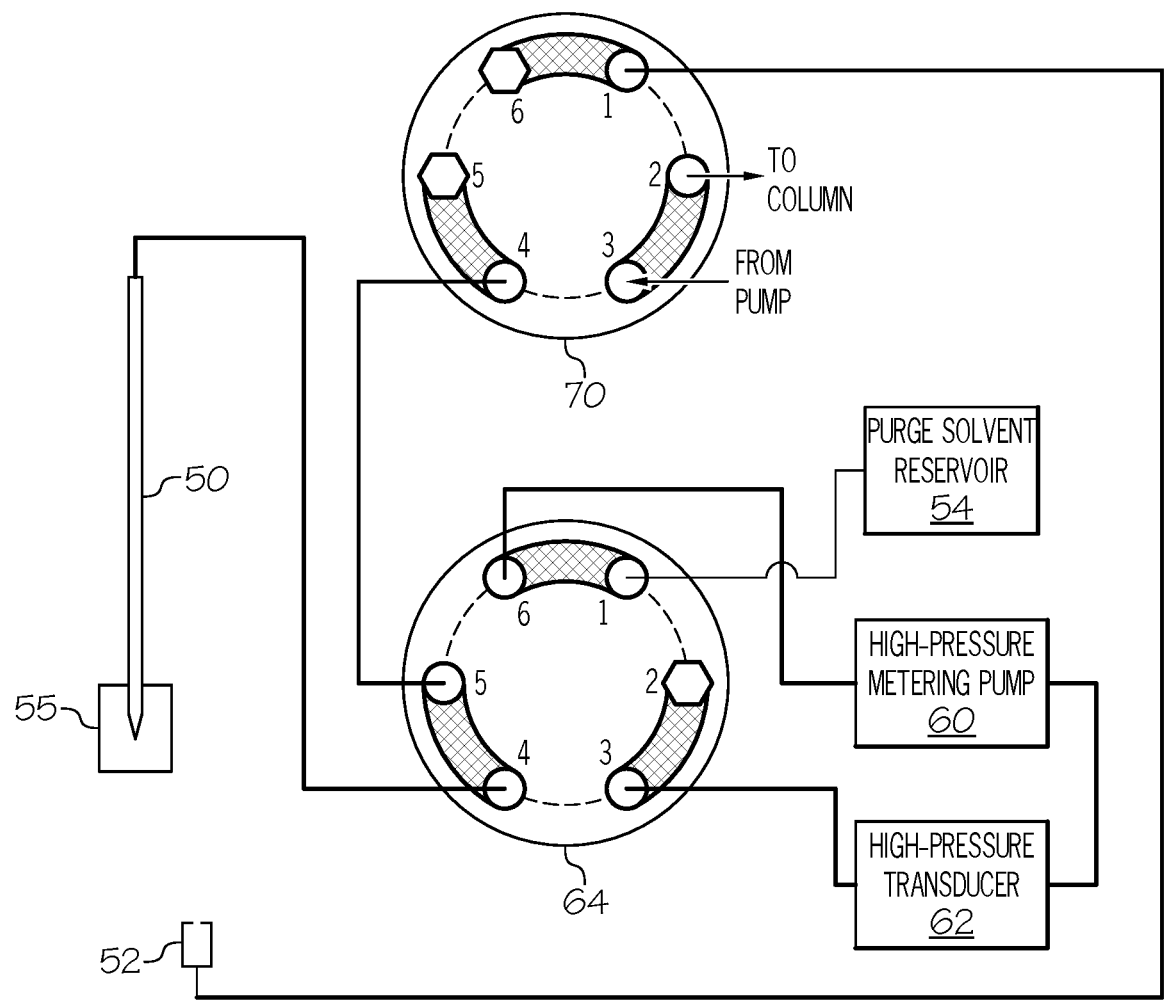
Figure 7C:
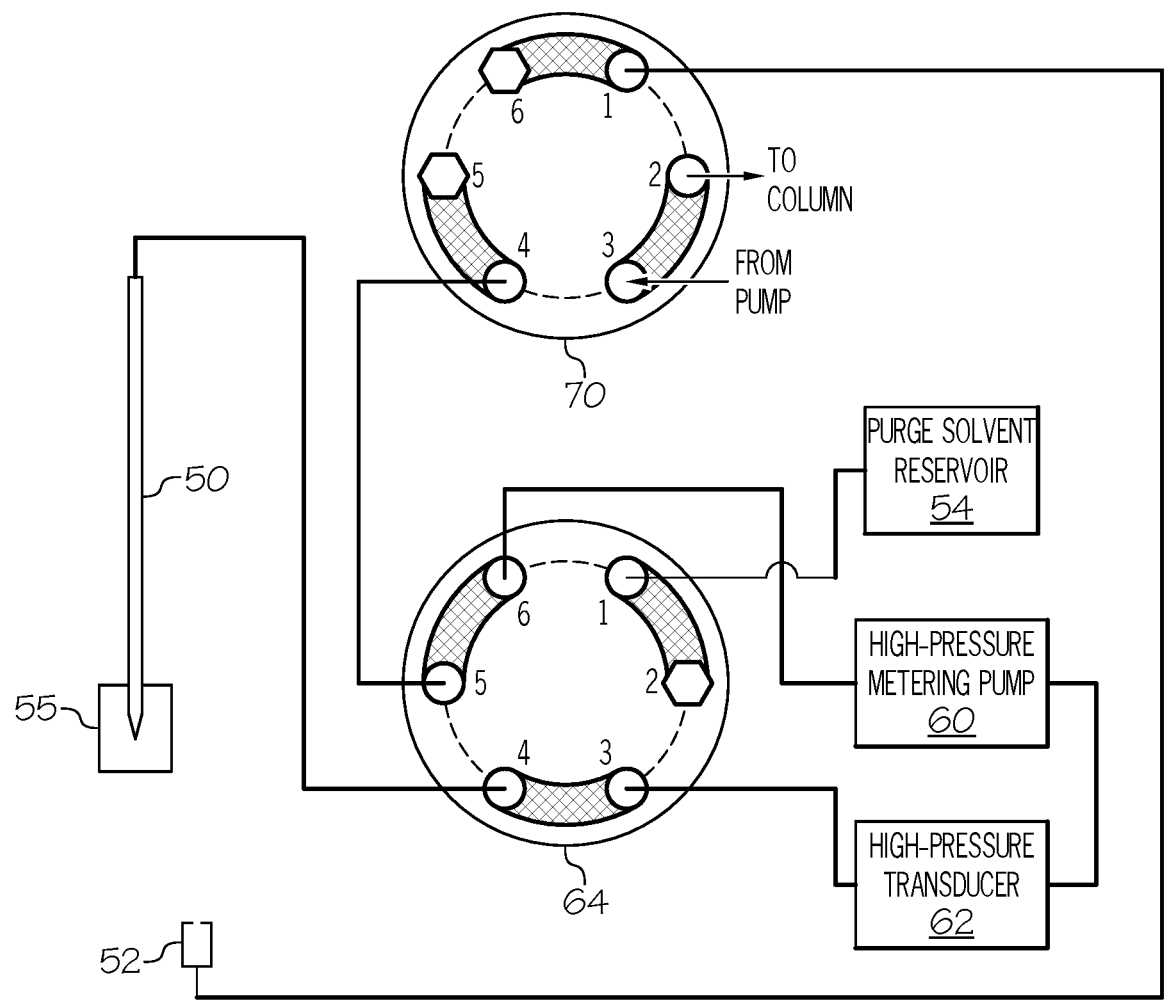

Ports 70-5 and 70-6 are terminated so that no fluid can enter or exit these ports. Port 70-1 is fluidically coupled to the needle seal 52, port 70-2 is fluidically coupled to the chromatographic column, port 70-3 is fluidically coupled to the source of mobile phase through a pump and port 70-4 is fluidically coupled to port 64-5 of the sample valve 64. The merge valve 70 can be configured in one of two possible valve states. When the merge valve 70 is in the first valve state, as illustrated, port 70-1 is coupled to port 70-6, port 70-2 is coupled to port 70-3 and port 70-4 is coupled to port 70-5. Conversely, when the merge valve 70 is in the second valve state, as shown in FIG. 7E, port 70-1 is coupled to port 70-2, port 70-3 is coupled to port 70-4 and port 70-5 is coupled to port 70-6.

Referring to FIG. 7A, the sample valve 64 is shown in its second valve state. The merge valve 70 is in a bypass state in which ports 70-2 and 70-3 are coupled together so that the chromatography system flow entering at port 70-3 can exit at port 70-2 and flow to the chromatographic column.

To load the sample, the metering pump 60 executes at least a portion of an intake stroke to draw in liquid under atmospheric pressure, resulting in sample being aspirated into the sample needle 50 from the sample vial 55. The volume of acquired sample is accurately controlled by the operation of the metering pump 60. If the volume of sample to be acquired is greater than the stroke volume of the metering pump 60, the sample valve 64 switches to the first valve state after the completion of the initial intake stroke, as shown in FIG. 7B. The metering pump 60 then executes a reset stroke before the sample valve 64 is switched back to the second valve state, as shown in FIG. 7C. Additional cycles of operation of the metering pump 60 according to FIGS. 7B and 7C can occur to acquire a greater total volume of sample.

Figure 7D:
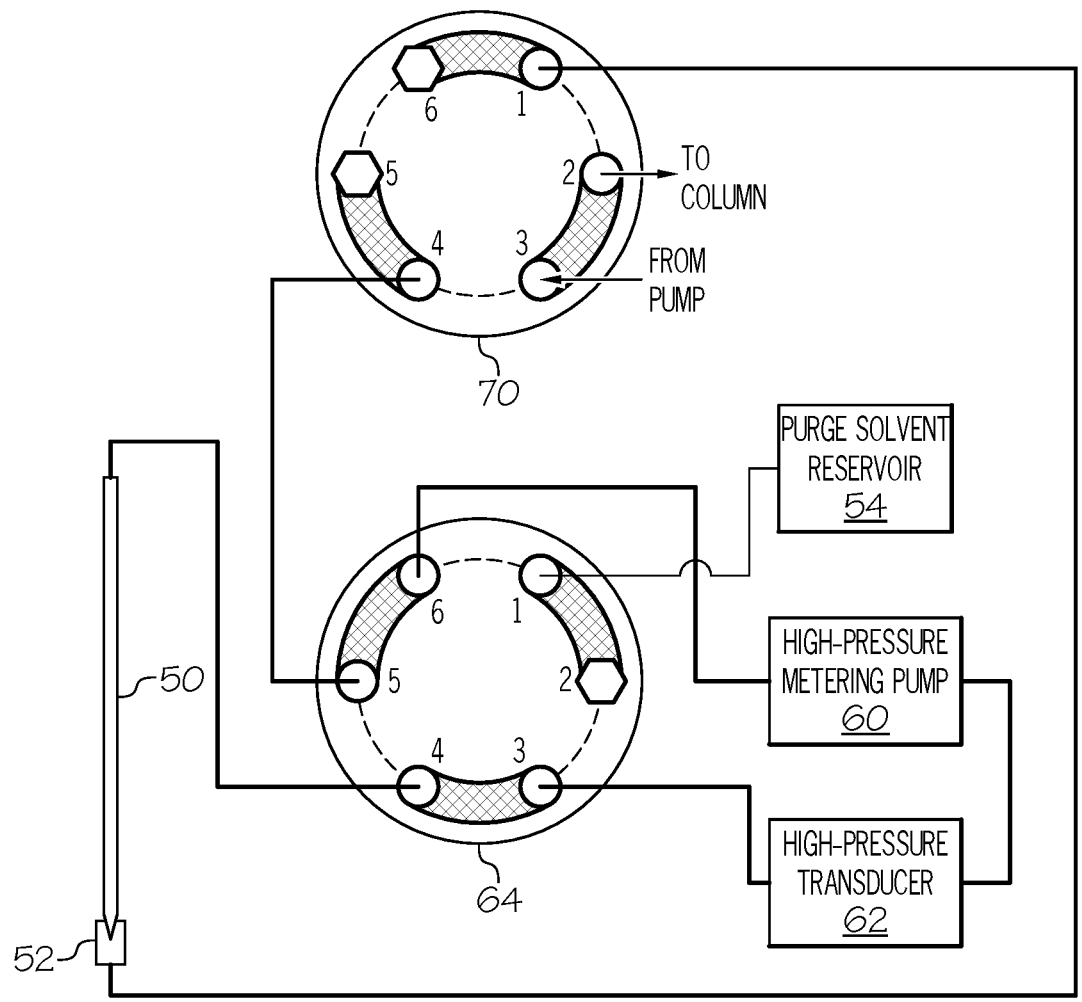
Figure 7E:
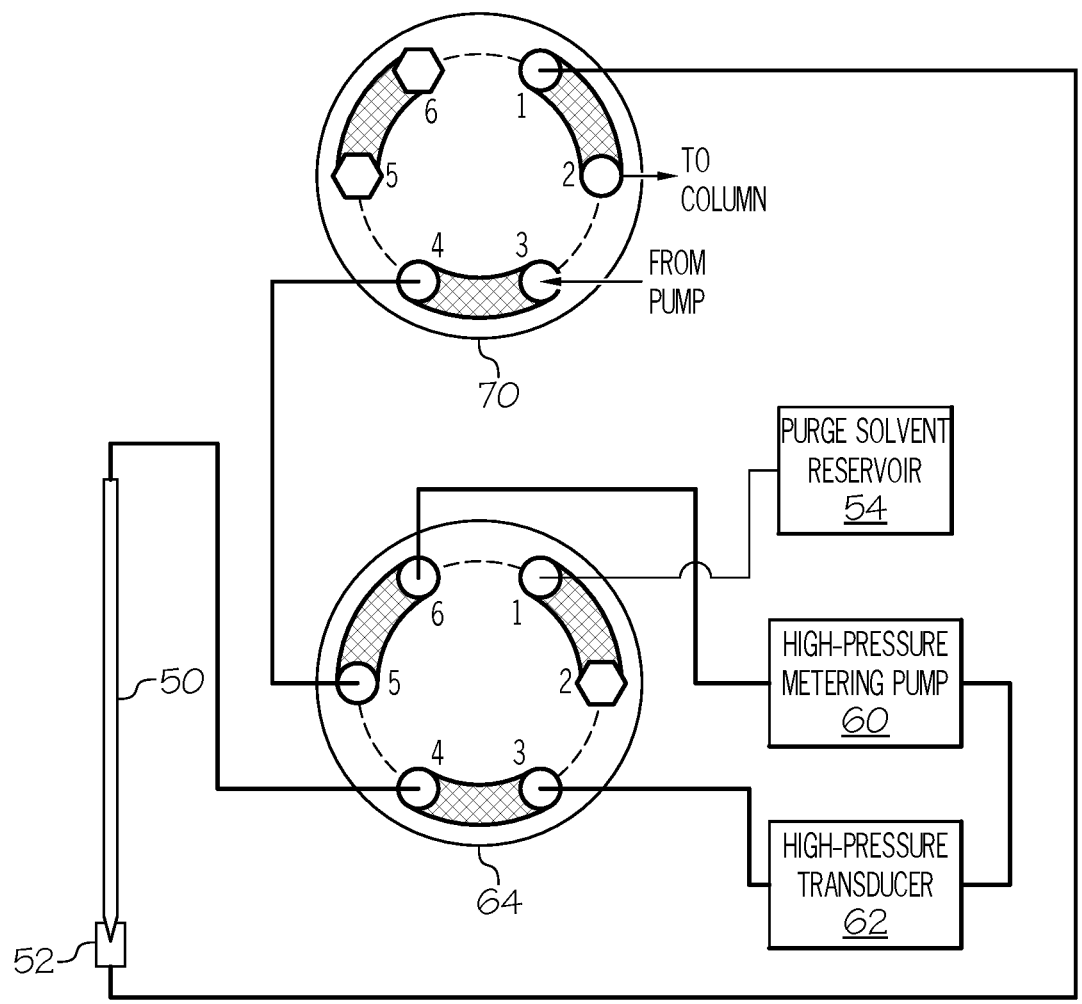

After the desired volume of sample is acquired, the sample needle 50 is moved from the sample vial 55 to the needle seal 52, as shown in FIG. 7D, while the valve states of the sample valve 64 and merge valve 70 remain unchanged. The fluidic path from the left side of the metering pump 60 remains terminated at the merge valve 70 and the fluidic path from the right side of the metering pump 60 through the pressure transducer 62, sample valve 64 and sample needle 50 similarly remains terminated at the merge valve 70. The metering pump 60 then executes a portion of a discharge stroke so that the pressure in the two fluidic paths increases to approximately the full system pressure, as confirmed by the pressure transducer 62.

Subsequently, the merge valve 70 is switched to the second valve state as shown in FIG. 7E. The mobile phase from the system pump received at port 70-3 then passes through the fluidic network before returning to port 70-1 and back out through port 70-2 to the chromatographic column. In this manner, a discrete fluidic plug comprising the volume of acquired sample in the fluidic network is injected into the flow of the mobile phase.

In an alternative embodiment, the fluidic network omits the purge solvent reservoir 54 and the fluidic channel (e.g., tubing) coupled at one end to port 64-1 of the sample valve 64 may extend to its opposite end to the system waste channel. This embodiment allows for a user to perform a backlash compensation for the metering pump 60.

In the alternative embodiment, the fluidic channel is occupied by the system solvent (e.g., mobile phase). For example, the fluidic network can be configured through valve switching so that the metering pump 60 can acquire the solvent on an intake stroke and subsequently execute a discharge stroke to push the acquired solvent through the fluidic channel to waste to thereby fill the full volume of the fluidic channel.

While the invention has been shown and described with reference to specific embodiments, it should be understood by those skilled in the art that various changes in form and detail may be made therein without departing from the scope of the invention as recited in the accompanying claims.

What is claimed is:

1. A method for injecting a chromatographic sample into a chromatography system flow, the method comprising:
   aspirating a chromatographic sample into a sample needle;
   forming a fluidic path that passes through the sample needle to an injection valve, wherein the fluidic path is terminated at each end and the chromatographic sample is included in a liquid in the fluidic path, wherein the injection valve includes a plurality of coupling paths between a plurality of valve ports that are of an equal length, wherein a first end of the each end of the fluidic path is terminated at a first valve port of the plurality of valve ports and a second end of the each end is terminated at a second valve port of the plurality of valve ports, and wherein each of the first valve port and the second valve port is separated from an adjacent valve port of the plurality of valve ports by a coupling path of the plurality of coupling paths having the equal length;

increasing a pressure of the liquid in the fluidic path to a value that is substantially equal to a pressure of a liquid chromatography system; and inserting the fluidic path into the liquid chromatography system flow such that the chromatographic sample flows to a chromatography column in the liquid chromatography system.

2. The method of claim 1 wherein a difference in the increased pressure of the liquid in the fluidic path and the pressure of the liquid chromatography system at a time of insertion is less than 10% of the pressure of the liquid chromatography system.

3. The method of claim 1 wherein forming the fluidic path includes coupling a needle tip of the sample needle into a needle seal that is in fluidic communication with one of the ends of the fluidic path.

4. The method of claim 1 wherein inserting the fluidic path into the liquid chromatography system flow comprises switching the injection valve from a first valve state to a second valve state.

5. The method of claim 1 further comprising monitoring the pressure of the liquid in the fluidic path while increasing the pressure to determine that the pressure of the liquid in the fluidic path is substantially equal to the pressure of the liquid chromatography system.

6. A fluidic network for acquiring and injecting a chromatographic sample comprising:
a metering pump module comprising a metering pump and a pressure transducer in serial fluidic communication with each other, the metering pump module having a first pump port and a second pump port;
a sample needle having a needle tip;
a needle seal configured to receive the needle tip of the sample needle;
a sample valve operable in at least a first valve state and a second valve state, and being in fluidic communication with the metering pump module and the sample needle; and
a merge valve operable in at least a first valve state and a second valve state, and being in fluidic communication with the sample valve and the needle seal,
wherein, when the sample valve is in the second valve state and the merge valve is in the first valve state, the metering pump is operable to acquire a sample through the sample needle,
wherein, when the sample valve is in the second valve state, the merge valve is in the first valve state and the needle tip is in the needle seal, the metering pump is operable to pressurize the fluidic network to a system pressure,
wherein, when the sample valve is in the second valve state, the merge valve is in the second valve state and the needle tip is in the needle seal, a system flow passes through the fluidic network such that the sample acquired through the sample needle is merged into the system flow, and
wherein, in each of the first valve state and the second valve state, the merge valve includes a plurality of coupling paths between a plurality of valve ports that are of an equal length.

7. The fluidic network of claim 6 wherein, when the sample valve is in the second valve state, the merge valve is in the second valve state and the needle tip is in the needle seal, the system flow passes through the fluidic network such that the sample acquired through the sample needle is injected into the system flow as a fluidic plug.

8. The fluidic network of claim 6 further comprising a purge solvent reservoir in fluidic communication with the sample valve.

9. The fluidic network of claim 6 wherein the sample valve is a six-port rotary shear seal valve.

10. The fluidic network of claim 6 wherein the merge valve is a six-port rotary shear seal valve.

* * * * *